United States Patent
Qin et al.

(10) Patent No.: US 11,595,566 B2
(45) Date of Patent: *Feb. 28, 2023

(54) CAMERA SWITCHING METHOD FOR TERMINAL, AND TERMINAL

(71) Applicant: HUAWEI TECHNOLOGIES CO., LTD., Guangdong (CN)

(72) Inventors: Chao Qin, Beijing (CN); Yuanyou Li, Oerlikon (CH); Zhiping Jia, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,324

(22) Filed: Jun. 30, 2022

(65) Prior Publication Data

US 2022/0337742 A1 Oct. 20, 2022

Related U.S. Application Data

(63) Continuation of application No. 17/262,742, filed as application No. PCT/CN2018/097676 on Jul. 27, 2018, now Pat. No. 11,412,132.

(51) Int. Cl.
*H04N 5/232* (2006.01)
*H04M 1/72403* (2021.01)
(Continued)

(52) U.S. Cl.
CPC ......... *H04N 5/23218* (2018.08); *G06F 3/041* (2013.01); *H04M 1/72403* (2021.01);
(Continued)

(58) Field of Classification Search
CPC ................ G06F 3/041; H04N 5/23218; H04N 5/23296; H04N 5/247; H04N 5/232933;
(Continued)

(56) References Cited

U.S. PATENT DOCUMENTS

| | | |
|---|---|---|
| 8,432,430 B2 | 4/2013 | Jun |
| 9,204,026 B2 | 12/2015 | Jeon |

(Continued)

FOREIGN PATENT DOCUMENTS

| | | |
|---|---|---|
| CN | 104333702 A | 2/2015 |
| CN | 105049711 A | 11/2015 |

(Continued)

OTHER PUBLICATIONS

Office Action dated Jun. 6, 2022 issued in Chinese Application No. 202111196803.5 (5 pages).

(Continued)

*Primary Examiner* — Pritham D Prabhakher

(57) ABSTRACT

Embodiments relate to the field of terminals and disclose a camera switching method for a terminal, and the terminal. In those embodiments, when the terminal is installed with a plurality of cameras, automatic and dynamic switching between the cameras may be implemented based on a to-be-photographed object, thereby improving a photographing effect of the to-be-photographed object. In those embodiment, the terminal may display, in response to a first operation of enabling a photographing function by a user, a first photographing picture captured by a first camera, where the first photographing picture includes a to-be-photographed object. If the to-be-photographed object cannot be displayed completely in the first photographing picture, the terminal may switch from the first photographing picture to a second photographing picture captured by the second camera, and disabling the first camera, where an FOV of the second camera is larger than an FOV of the first camera.

20 Claims, 23 Drawing Sheets

(51) Int. Cl.
*G06F 3/041* (2006.01)
*H04N 5/247* (2006.01)

(52) U.S. Cl.
CPC ..... *H04N 5/23222* (2013.01); *H04N 5/23296* (2013.01); *H04N 5/232933* (2018.08); *H04N 5/247* (2013.01); *H04M 2250/22* (2013.01); *H04M 2250/52* (2013.01)

(58) Field of Classification Search
CPC ............ H04N 5/2258; H04N 5/23222; H04M 2250/52; H04M 2250/22
USPC .................................................... 348/207.11
See application file for complete search history.

(56) References Cited

U.S. PATENT DOCUMENTS

| | | | |
|---|---|---|---|
| 9,363,426 B2* | 6/2016 | Malkin | H04N 5/23218 |
| 9,914,056 B2* | 3/2018 | Amano | A63F 13/525 |
| 10,061,486 B2* | 8/2018 | Kaehler | G06F 3/04842 |
| 10,171,771 B2 | 1/2019 | Tangeland | |
| 10,291,836 B2* | 5/2019 | Taoki | H04N 5/23206 |
| 10,291,842 B2 | 5/2019 | Kim | |
| 10,389,948 B2 | 8/2019 | Nash | |
| 10,432,847 B2* | 10/2019 | Yamajo | H04N 9/04515 |
| 10,594,925 B2 | 3/2020 | Srivastava | |
| 10,645,272 B2 | 5/2020 | Srivastava | |
| 10,659,683 B2 | 5/2020 | Campbell | |
| 10,771,706 B2 | 9/2020 | Lee | |
| 10,819,911 B2 | 10/2020 | Ryu | |
| 11,057,572 B1* | 7/2021 | Wang | H04N 5/2628 |
| 11,228,748 B2 | 1/2022 | Park | |
| 2011/0085015 A1 | 4/2011 | Jun et al. | |
| 2012/0105579 A1 | 5/2012 | Jeon | |
| 2012/0242809 A1 | 9/2012 | White et al. | |
| 2013/0235224 A1* | 9/2013 | Park | H04N 5/272 348/E5.024 |
| 2014/0232904 A1* | 8/2014 | Na | H04N 5/2355 348/239 |
| 2014/0340543 A1 | 11/2014 | Nakada | |
| 2016/0050370 A1 | 2/2016 | Campbell | |
| 2016/0063731 A1* | 3/2016 | Yamamoto | G06T 7/292 348/159 |
| 2016/0127635 A1* | 5/2016 | Taoki | H04N 5/23206 348/39 |
| 2016/0127690 A1* | 5/2016 | Kaehler | G06F 3/04815 348/143 |
| 2016/0381289 A1 | 12/2016 | Kim et al. | |
| 2018/0041715 A1 | 2/2018 | Forsblom | |
| 2018/0160046 A1 | 6/2018 | Nash et al. | |
| 2018/0295292 A1 | 10/2018 | Lee | |
| 2018/0302551 A1* | 10/2018 | Yamajo | H04N 5/2258 |
| 2019/0043003 A1 | 2/2019 | Fisher | |
| 2019/0045135 A1 | 2/2019 | Ryu | |
| 2019/0174054 A1 | 6/2019 | Srivastava | |
| 2019/0174055 A1 | 6/2019 | Srivastava | |
| 2019/0191079 A1 | 6/2019 | Mehta | |
| 2020/0267326 A1* | 8/2020 | Yim | H04N 5/23296 |

FOREIGN PATENT DOCUMENTS

| | | |
|---|---|---|
| CN | 205545654 U | 8/2016 |
| CN | 106161941 A | 11/2016 |
| CN | 106341611 A | 1/2017 |
| CN | 106454121 A | 2/2017 |
| CN | 106454132 A | 2/2017 |
| CN | 106454139 A | 2/2017 |
| CN | 106506957 A | 3/2017 |
| CN | 107333067 A | 11/2017 |
| CN | 107690649 A | 2/2018 |
| CN | 108174085 A | 6/2018 |
| EP | 3116215 A2 | 1/2017 |
| WO | 2014199338 A2 | 12/2014 |
| WO | 2016007799 A1 | 1/2016 |
| WO | 2018007951 A1 | 1/2018 |

OTHER PUBLICATIONS

Office Action issued in CN 201880023140.7, dated Mar. 30, 2020, 8 pages.
Extended European Search Report issued in EP 18928001.9, dated Jun. 9, 2021, 17 pages.
International Search Report and Written Opinion issued in PCT/CN2018/097676, dated Feb. 11, 2019, 10 pages.

* cited by examiner

CAMERA SWITCHING METHOD FOR TERMINAL, AND TERMINAL

CROSS-REFERENCE TO RELATED APPLICATIONS

This application is a continuation of U.S. patent application Ser. No. 17/262,742, filed on Jan. 24, 2021, which is a national stage of International Application No. PCT/CN2018/097676, filed on Jul. 27, 2018, All of the aforementioned applications are hereby incorporated by reference in their entireties.

TECHNICAL FIELD

This disclosure relates to the field of terminals, and in particular, to a camera switching method for a terminal, and the terminal.

BACKGROUND

A field of view (FOV) may also be referred to as an angle of view. A field of vision of an optical instrument (such as a camera) depends on a size of the field of view. A larger FOV of a camera means a larger field of vision of a photographing picture, and a smaller FOV of a camera means a smaller field of vision of a photographing picture.

Currently, many mobile terminals such as mobile phones are installed with dual cameras to improve photographing quality. For example, a wide-angle camera 1 with a relatively large FOV and a long-focus camera 2 with a relatively small FOV may be installed on a mobile phone. A user may manually change a focal length, to trigger the mobile phone to switch between the cameras. For example, when detecting that the user extends the focal length by two times or more during photographing, the mobile phone may automatically switch to the long-focus camera 2. Alternatively, the mobile phone may further switch between the cameras based on an intensity of ambient light. For example, when the intensity of the ambient light is relatively low, the mobile phone may automatically switch to the wide-angle camera 1 to get more light. However, during photographing, the user is more concerned with a photographing effect of a to-be-photographed object in a photographing picture. The foregoing camera switching method cannot ensure the photographing effect of the to-be-photographed object, resulting in a poor photographing effect.

SUMMARY

Various embodiments provide a camera switching method for a terminal, and the terminal. When the terminal is installed with a plurality of cameras, automatic and dynamic switching between the cameras may be implemented based on a to-be-photographed object, thereby improving a photographing effect of the to-be-photographed object.

To achieve the foregoing objective, the following technical solutions are used.

According to a first aspect, various embodiments provide a camera switching method for a terminal, including: displaying, by the terminal in response to a first operation of enabling a photographing function by a user, a first photographing picture captured by a first camera, where the first photographing picture includes a to-be-photographed object; and if the to-be-photographed object cannot be displayed completely in the first photographing picture, which means that an FOV of the currently used first camera is relatively small, switching, by the terminal, from the first photographing picture to a second photographing picture captured by a second camera (where an FOV of the second camera is larger than the FOV of the first camera), and disabling the first camera. In other words, the terminal can determine, based on a location and a size of the to-be-photographed object in a photographing picture, a camera that can ensure a photographing effect of the to-be-photographed object, to automatically and intelligently help the user switch to a proper camera to photograph the to-be-photographed object in a photographing process, thereby improving a photographing effect of to-be-photographed object.

In one implementation of the method, after the terminal determines the to-be-photographed object in the first photographing picture, the method further includes: determining, by the terminal, whether the to-be-photographed object or a placeholder region of the to-be-photographed object coincides with a boundary line of the first photographing picture, where the to-be-photographed object is located in the placeholder region; and if the to-be-photographed object or the placeholder region of the to-be-photographed object coincides with the boundary line of the first photographing picture, determining, by the terminal, that the to-be-photographed object cannot be displayed completely in the first photographing picture; or if the to-be-photographed object or the placeholder region of the to-be-photographed object does not coincide with the boundary line of the first photographing picture, determining, by the terminal, that the to-be-photographed object can be displayed completely in the first photographing picture.

In one implementation of the method, after the displaying, by the terminal, a first photographing picture captured by a first camera, the method further includes: determining, by the terminal, the to-be-photographed object in the first photographing picture.

In one implementation of the method, after the determining, by the terminal, the to-be-photographed object in the first photographing picture, the method further includes: receiving, by the terminal, a second operation input on the first photographing picture, where the second operation is used to select the to-be-photographed object in the first photographing picture; and the determining, by the terminal, the to-be-photographed object in the first photographing picture includes: extracting, by the terminal in response to the second operation, an image feature at a location selected by the user in the first photographing picture, and determining the to-be-photographed object based on the image feature.

In one implementation of the method, the switching, by the terminal, from the first photographing picture to a second photographing picture captured by a second camera includes: enabling, by the terminal, the second camera in a background to capture the second photographing picture; gradually zooming in, by the terminal, content in the second photographing picture through digital zooming; when the zoomed-in content in the second photographing picture is consistent with content in the first photographing picture, disabling, by the terminal, the first camera and displaying the zoomed-in second photographing picture in a foreground; and gradually restoring, by the terminal, to a standard focal length for capturing the second photographing picture until the terminal completely displays the second photographing picture. In this way, smooth transition is implemented in a process in which the terminal switches from the first photographing picture to the second photographing picture, to avoid a sudden change of vision caused by a jump from the first photographing picture to the second photographing picture, thereby improving user experience.

In one implementation of the method, if the to-be-photographed object can be displayed completely in the first photographing picture, the method further includes: determining, by the terminal, a to-be-switched-to target camera based on a size and/or a location of the to-be-photographed object in the first photographing picture; and switching, by the terminal, from the first photographing picture to a photographing picture captured by the target camera.

According to a second aspect, various embodiments provide a camera switching method for a terminal, where the terminal includes at least two cameras, and the method includes: displaying, by the terminal in response to a first operation of enabling a photographing function by a user, a first photographing picture captured by a first camera, where the first photographing picture includes a to-be-photographed object; if the to-be-photographed object can be displayed completely in the first photographing picture, determining, by the terminal, a target camera with a better photographing effect based on a size and/or a location of the to-be-photographed object in the first photographing picture; and switching, by the terminal, from the first photographing picture to a photographing picture captured by the target camera, and disabling the first camera.

In one implementation of the method, the determining, by the terminal, a to-be-switched-to target camera based on a location of the to-be-photographed object in the first photographing picture includes: determining, by the terminal through calculation, whether the to-be-photographed object is displayed completely in a preset best photographing region in the first photographing picture, where the best photographing region is located in a center of the first photographing picture; and if the to-be-photographed object cannot be displayed completely in the best photographing region, determining, by the terminal, a second camera as the target camera, where an FOV of the second camera is larger than an FOV of the first camera.

In one implementation of the method, the determining, by the terminal, a to-be-switched-to target camera based on a size of the to-be-photographed object in the first photographing picture includes: calculating, by the terminal, a target ratio of the to-be-photographed object in the first photographing picture; and if the target ratio is greater than an upper limit of a preset target ratio range, determining, by the terminal, a second camera as the target camera, where an FOV of the second camera is larger than an FOV of the first camera; or if the target ratio is less than a lower limit of a preset target ratio range, determining, by the terminal, a third camera as the target camera, where an FOV of the third camera is smaller than the FOV of the first camera.

In one implementation of the method, the determining, by the terminal, a to-be-switched-to target camera based on a size and a location of the to-be-photographed object in the first photographing picture includes: determining, by the terminal, a location relationship between the first photographing picture, a second photographing picture, and a third photographing picture, where the second photographing picture is a photographing picture that is determined through calculation based on the first photographing picture and that is photographed when a second camera is enabled, the third photographing picture is a photographing picture that is determined through calculation based on the first photographing picture and that is photographed when a third camera is enabled, an FOV of the second camera is larger than an FOV of the first camera, and an FOV of the third camera is smaller than the FOV of the first camera; and determining, by the terminal, the to-be-switched-to target camera based on the size and the location of the to-be-photographed object in the first photographing picture, a size and a location of the to-be-photographed object in the second photographing picture, and a size and a location of the to-be-photographed object in the third photographing picture.

In one implementation of the method, the determining, by the terminal, the to-be-switched-to target camera based on the size and the location of the to-be-photographed object in the first photographing picture, a size and a location of the to-be-photographed object in the second photographing picture, and a size and a location of the to-be-photographed object in the third photographing picture include: determining, by the terminal, at least one candidate camera from the first camera, the second camera, and the third camera, where a photographing picture of the candidate camera can completely display the to-be-photographed object; and determining, by the terminal, the target camera from the candidate camera, where a target ratio of the to-be-photographed object in the photographing picture of the target camera meets a preset condition.

In one implementation of the method, the target camera is the second camera, and the FOV of the second camera is larger than the FOV of the first camera; and the switching, by the terminal, from the first photographing picture to a photographing picture captured by the target camera includes: enabling, by the terminal, the second camera in a background to capture the second photographing picture; gradually zooming in, by the terminal, content in the second photographing picture through digital zooming; when the zoomed-in content in the second photographing picture is consistent with content in the first photographing picture, disabling, by the terminal, the first camera and displaying the zoomed-in second photographing picture in a foreground; and gradually restoring, by the terminal, to a standard focal length for capturing the second photographing picture until the terminal completely displays the second photographing picture.

In one implementation of the method, the target camera is the third camera, and the FOV of the third camera is smaller than the FOV of the first camera; and the switching, by the terminal, from the first photographing picture to a photographing picture captured by the target camera includes: enabling, by the terminal, the third camera in a background to capture the third photographing picture; gradually zooming in, by the terminal, content in the first photographing picture through digital zooming; and when the zoomed-in content in the first photographing picture is consistent with content in the third photographing picture, disabling, by the terminal, the first camera and displaying the third photographing picture in a foreground.

According to a third aspect, various embodiments provide a terminal, including: a receiving unit, a display unit, a determining unit, and a switching unit, where the receiving unit is configured to receive a first operation of enabling a photographing function by a user; the display unit is configured to display a first photographing picture captured by a first camera, where the first photographing picture includes a to-be-photographed object; and the switching unit is configured to: if the to-be-photographed object cannot be displayed completely in the first photographing picture, switch from the first photographing picture to a second photographing picture captured by a second camera, and disable the first camera, where an FOV of the second camera is larger than an FOV of the first camera.

In one implementation of the method, the determining unit is configured to: determine whether the to-be-photographed object or a placeholder region of the to-be-photographed object coincides with a boundary line of the first photographing picture, where the to-be-photographed object is located in the placeholder region; and if the to-be-photographed object or the placeholder region of the to-be-photographed object coincides with the boundary line of the first photographing picture, determine that the to-be-photographed object cannot be displayed completely in the first photographing picture; or if the to-be-photographed object or the placeholder region of the to-be-photographed object does not coincide with the boundary line of the first photographing picture, determine that the to-be-photographed object can be displayed completely in the first photographing picture.

In one implementation of the method, the determining unit is further configured to determine the to-be-photographed object in the first photographing picture.

In one implementation of the method, the receiving unit is further configured to receive a second operation input on the first photographing picture, where the second operation is used to select the to-be-photographed object in the first photographing picture; and the determining unit is specifically configured to: extract, in response to the second operation, an image feature at a location selected by the user in the first photographing picture, and determine the to-be-photographed object based on the image feature.

In one implementation of the method, the switching unit is configured to: enable the second camera in a background to capture the second photographing picture; gradually zoom in content in the second photographing picture through digital zooming; when the zoomed-in content in the second photographing picture is consistent with content in the first photographing picture, disable the first camera and display the zoomed-in second photographing picture in a foreground; and gradually restore to a standard focal length for capturing the second photographing picture until the terminal completely displays the second photographing picture.

In one implementation of the method, the determining unit is further configured to: if the to-be-photographed object can be displayed completely in the first photographing picture, determine a to-be-switched-to target camera based on a size and/or a location of the to-be-photographed object in the first photographing picture; and the switching unit is further configured to switch from the first photographing picture to a photographing picture captured by the target camera.

According to a fourth aspect, various embodiments provide a terminal, including: a receiving unit, a display unit, a determining unit, and a switching unit, where the receiving unit is configured to receive a first operation of enabling a photographing function by a user; the display unit is configured to display a first photographing picture captured by a first camera, where the first photographing picture includes a to-be-photographed object; the determining unit is configured to: if the to-be-photographed object can be displayed completely in the first photographing picture, determine a to-be-switched-to target camera based on a size and/or a location of the to-be-photographed object in the first photographing picture; and the switching unit is configured to switch from the first photographing picture to a photographing picture captured by the target camera, and disable the first camera.

In one implementation of the method, the determining unit is specifically configured to: determine, through calculation, whether the to-be-photographed object is displayed completely in a preset best photographing region in the first photographing picture, where the best photographing region is located in a center of the first photographing picture; and if the to-be-photographed object cannot be displayed completely in the best photographing region, determine a second camera as the target camera, where an FOV of the second camera is larger than an FOV of the first camera.

In one implementation of the method, the determining unit is specifically configured to: calculate a target ratio of the to-be-photographed object in the first photographing picture; and if the target ratio is greater than an upper limit of a preset target ratio range, determine a second camera as the target camera, where an FOV of the second camera is larger than an FOV of the first camera; or if the target ratio is less than a lower limit of a preset target ratio range, determine a third camera as the target camera, where an FOV of the third camera is smaller than the FOV of the first camera.

In one implementation of the method, the determining unit is specifically configured to: determine a location relationship between the first photographing picture, a second photographing picture, and a third photographing picture, where the second photographing picture is a photographing picture that is determined through calculation based on the first photographing picture and that is photographed when a second camera is enabled, the third photographing picture is a photographing picture that is determined through calculation based on the first photographing picture and that is photographed when a third camera is enabled, an FOV of the second camera is larger than an FOV of the first camera, and an FOV of the third camera is smaller than the FOV of the first camera; and determine the to-be-switched-to target camera based on the size and the location of the to-be-photographed object in the first photographing picture, a size and a location of the to-be-photographed object in the second photographing picture, and a size and a location of the to-be-photographed object in the third photographing picture.

In one implementation of the method, the determining unit is specifically configured to: determine at least one candidate camera from the first camera, the second camera, and the third camera, where a photographing picture of the candidate camera can completely display the to-be-photographed object; and determine the target camera from the candidate camera, where a target ratio of the to-be-photographed object in the photographing picture of the target camera meets a preset condition.

In one implementation of the method, the switching unit is specifically configured to: enable the second camera in a background to capture the second photographing picture; gradually zoom in content in the second photographing picture through digital zooming; when the zoomed-in content in the second photographing picture is consistent with content in the first photographing picture, disable the first camera and display the zoomed-in second photographing picture in a foreground; and gradually restore to a standard focal length for capturing the second photographing picture until the terminal completely displays the second photographing picture.

In one implementation of the method, the switching unit is specifically configured to: enable the third camera in a background to capture the third photographing picture; gradually zoom in content in the first photographing picture through digital zooming; and when the zoomed-in content in the first photographing picture is consistent with content in the third photographing picture, disable the first camera and display the third photographing picture in a foreground.

According to a fifth aspect, this disclosure provides a terminal, including at least two cameras, a touchscreen, one or more processors, a memory, and one or more programs. The processor is coupled to the memory, and the one or more programs are stored in the memory. When the terminal runs, the processor executes the one or more programs stored in the memory, to enable the terminal to perform the camera switching method for a terminal according to any one of the foregoing aspects or possible designs.

According to a sixth aspect, this disclosure provides a computer storage medium, including a computer instruction. When the computer instruction is run on a terminal, the terminal is enabled to perform the camera switching method for a terminal according to any one of the foregoing aspects or possible designs.

According to a seventh aspect, this disclosure provides a computer program product. When the computer program product is run on a computer, the computer is enabled to perform the camera switching method for a terminal according to any one of the foregoing aspects or possible designs.

It can be understood that the terminal according to the third aspect to the fifth aspect, the computer storage medium according to the sixth aspect, and the computer program product according to the seventh aspect each are configured to perform the corresponding method provided above. Therefore, for achievable beneficial effects thereof, refer to the beneficial effects in the corresponding method provided above. Details are not described herein again.

DESCRIPTION OF EMBODIMENTS

The following describes the implementations of the embodiments of this disclosure in detail with reference to accompanying drawings.

A camera switching method provided in the embodiments may be applied to a terminal. For example, the terminal may be a mobile phone, a tablet computer, a desktop computer, a laptop computer, a notebook computer, an ultra-mobile personal computer (UMPC), a handheld computer, a netbook, a personal digital assistant (PDA), a wearable electronic device, or a virtual reality device. A specific form of the terminal is not particularly limited in the embodiments of this disclosure.

Figure 1:
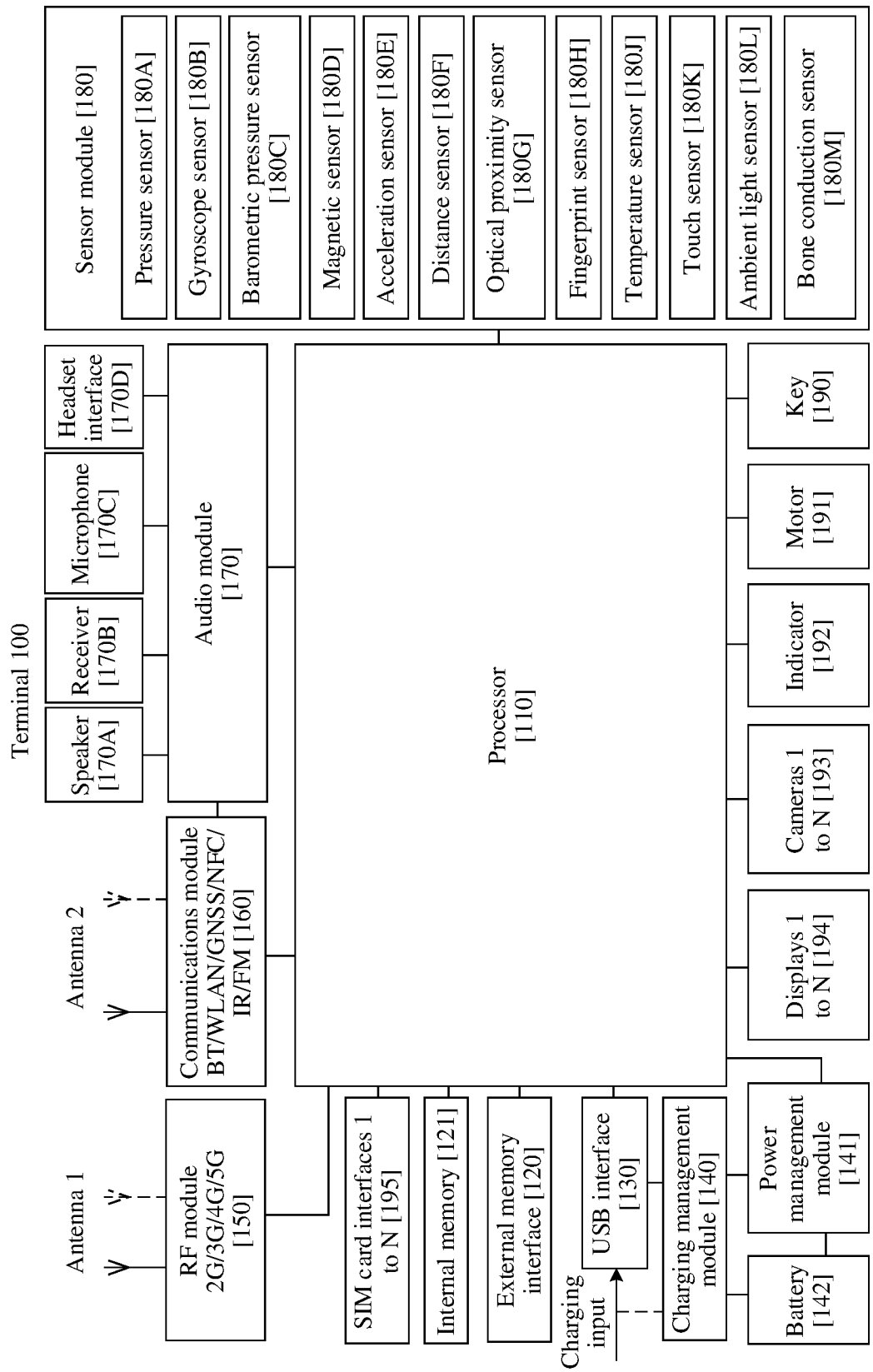
FIG. 1 is a first schematic structural diagram of a terminal according to an embodiment of this disclosure.

FIG. 1 is a structural block diagram of a terminal 100 according to an embodiment of the present invention.

The terminal 100 may include a processor 110, an external memory interface 120, an internal memory 121, a USB interface 130, a charging management module 140, a power management module 141, a battery 142, an antenna 1, an antenna 2, a radio frequency module 150, a communications module 160, an audio module 170, a speaker 170A, a receiver 170B, a microphone 170C, a headset interface 170D, a sensor module 180, a key 190, a motor 191, an indicator 192, a camera 193, a display screen 194, a SIM card interface 195, and the like. The sensor module may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The structure illustrated in this embodiment of the present invention does not constitute any limitation on the terminal 100. The terminal 100 may include more or fewer components than those illustrated in the figure, some components may be combined, some components may be split, or there may be a different component arrangement. The illustrated components may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a decision-maker that commands the various components in the terminal 100 to work in coordination according to an instruction, and is a neural center and a command center of the terminal 100. The controller generates an operation control signal based on an instruction operation code and a sequence signal, to control a fetch instruction and an execution instruction.

The processor 110 may further be provided with a memory, configured to store an instruction and data. In some embodiments, the memory in the processor is a cache memory, which can store an instruction or data recently used or cyclically used by the processor. If the processor needs to use the instruction or data again, the processor may directly invoke the instruction or data from the memory. This avoids repeated access and reduces a waiting time of the processor, thereby improving system efficiency.

In some embodiments, the processor 110 may include an interface. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general purpose input/output (GPIO) interface, a subscriber identity module (SIM) interface, a universal serial bus (USB) interface, and/or the like.

The I2C interface is a two-way synchronous serial bus that includes a serial data line (SDA) and a serial clock line (SCL). In some embodiments, the processor may include a plurality of I2C buses. The processor may be separately coupled to the touch sensor, a charger, a flashlight, the camera, and the like through different I2C bus interfaces. For example, the processor may be coupled to the touch sensor through an I2C interface, so that the processor communicates with the touch sensor through an I2C bus interface, to implement a touch function of the terminal 100.

The I2S interface may be configured to audio communication. In some embodiments, the processor may include a plurality of I2S buses. The processor may be coupled to the audio module through an I2S bus, to implement communication between the processor and the audio module. In some embodiments, the audio module may transmit an audio signal to the communications module through the I2S interface, to implement a function of answering a call by using a Bluetooth headset.

The PCM interface may also be configured for audio communication, to perform sampling, quantization, and encoding on an analog signal. In some embodiments, the audio module may be coupled to the communications module through a PCM bus interface. In some embodiments, the audio module may also transmit an audio signal to the communications module through the PCM interface, to implement a function of answering a call by using a bluetooth headset. Both the I2S interface and the PCM interface may be configured for audio communication. These two types of interfaces have different sampling rates.

The UART interface is a universal serial data bus for asynchronous communication. The bus is a two-way communications bus that performs serial-parallel conversion on transmitted data. In some embodiments, the UART interface is usually configured to connect the processor and the communications module 160. For example, the processor communicates with a bluetooth module through the UART interface, to implement a bluetooth function. In some embodiments, the audio module may transmit an audio signal to the communications module through the UART interface, to implement a function of playing music by using a Bluetooth headset.

The MIPI interface may be configured to connect the processor and a peripheral component such as the display screen or the camera. The MIPI interface includes a camera serial interface (CSI), a display serial interface (DSI), and the like. In some embodiments, the processor communicates with the camera through the CSI interface, to implement a photographing function of the terminal 100. The processor communicates with the display screen through the DSI interface, to implement a display function of the terminal 100.

The GPIO interface may be configured by using software. The GPIO interface may be configured to transmit and receive a control signal, or may be configured to transmit and receive a data signal. In some embodiments, the GPIO interface may be configured to connect the processor to the camera, the display screen, the communications module, the audio module, and a sensor. The GPIO interface may further be configured as an I2C interface, an I2S interface, a UART interface, an MIPI interface, and the like.

The USB interface 130 may be a mini USB interface, a micro USB interface, a USB type C interface, or the like. The USB interface may be configured to connect to the charger to charge the terminal 100, may also be configured to transmit data between the terminal 100 and a peripheral device, may also be configured to connect to a headset, to play audio through the headset, and may further be configured to connect to another electronic device, such as an AR device.

An interface connection relationship between the modules that is illustrated in this embodiment of the present invention is only intended for illustrative description, and does not constitute any limitation on a structure of the terminal 100. The terminal 100 may use an interface connection manner different from that in this embodiment of the present invention or use a combination of a plurality of interface connection manners.

The charging management module 140 is configured to receive a charging input from the charger. The charger may be a wireless charger, or may be a wired charger. In some wired charging embodiments, the charging management module may receive a charging input from a wired charger through the USB interface. In some wireless charging embodiments, the charging management module may receive a wireless charging input from a wireless charging coil of the terminal 100. The charging management module may further supply power to the terminal device through the power management module 141 while charging the battery.

The power management module 141 is configured to connect to the battery 142, the charging management module 140, and the processor 110. The power management module receives an input and/or inputs from the battery and/or the charging management module, to supply power to the processor, the internal memory, an external memory, the display screen, the camera, the wireless communications module, and the like. The power management module may further be configured to monitor parameters such as a battery capacity, a quantity of battery circles, and a battery health status (electric leakage or impedance). In some embodiments, the power management module 141 may alternatively be disposed in the processor 110. In some embodiments, the power management module 141 and the charging management module may alternatively be disposed in a same device.

A wireless communication function of the terminal 100 may be implemented by using the antenna module 1, the antenna module 2, the radio frequency module 150, the communications module 160, a modem, and the baseband processor.

The antenna 1 and the antenna 2 are configured to transmit and receive electromagnetic wave signals. Each antenna in the terminal 100 may be configured to cover one or more communication frequency bands. Different antennas may be reused, to improve antenna utilization. For example, an antenna of a cellular network may be reused as a diversity antenna of a wireless local area network. In some embodiments, an antenna may be used in combination with a tuning switch.

The radio frequency module 150 may provide a wireless communication solution applied to the terminal 100, including 2G, 3G, 4G, 5G, or the like. The radio frequency module may include at least one filter, a switch, a power amplifier, a low noise amplifier (LNA), and the like. The radio frequency module receives an electromagnetic wave through the antenna 1; perform filtering, amplification, and other processing on the received electromagnetic wave; and transfer a processed electromagnetic wave to the modem for demodulation. The radio frequency module may further amplify a signal modulated by the modem, convert an amplified signal into an electromagnetic wave by using the antenna 1, and radiate the electromagnetic wave through the antenna 1. In some embodiments, at least some function modules of the radio frequency module 150 may be disposed in the processor 150. In some embodiments, at least some function modules of the radio frequency module 150 may be disposed in a same device as at least some modules of the processor 110.

The modem may include a modulator and a demodulator. The modulator is configured to modulate a to-be-sent low frequency baseband signal into an intermediate frequency or high frequency signal. The modulator is configured to demodulate a received electromagnetic wave signal into a low frequency baseband signal. Then the demodulator transfers the low frequency baseband signal obtained through demodulation to the baseband processor for processing. The low frequency baseband signal is transferred to the application processor after being processed by the baseband processor. The application processor outputs a voice signal through an audio device (including but not limited to the speaker and the receiver), or displays an image or a video through the display screen. In some embodiments, the modem may be an independent device. In some embodiments, the modem may be independent of the processor, and is disposed in a same device as the radio frequency module or another function module.

The communications module 160 may be a communication processing module that provides wireless communication solutions applied to the terminal 100, for example, wireless local area network (WLAN), bluetooth (BT), global navigation satellite system (GNSS), frequency modulation (fFM), near field communication (NFC), and infrared (IR) technologies. The communications module 160 may be one or more devices integrated with at least one communication processing module. The communications module receives an electromagnetic wave signal through the antenna 2, performs frequency modulation and filtering processing on the electromagnetic wave signal, and sends a processed signal to the processor. The communications module 160 may further receive a to-be-sent signal from the processor, perform frequency modulation and amplification processing on the to-be-sent signal, convert a processed to-be-sent signal into an electromagnetic wave by using the antenna 2, and radiate the electromagnetic wave through the antenna 2.

In some embodiments, in the terminal 100, the antenna 1 is coupled to the radio frequency module, and the antenna 2 is coupled to the communications module, so that the terminal 100 can communicate with a network and another device by using a wireless communications technology. The wireless communications technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, IR, and/or other technologies. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The terminal 100 implements a display function by using the GPU, the display screen 194, the application processor, and the like. The GPU is a microprocessor for image processing, and is connected to the display screen and the application processor. The GPU is configured to perform mathematical and geometric calculation, and is configured to perform graphics rendering. The processor 110 may include one or more GPUs, and execute a program instruction to generate or change display information.

The display screen 194 is configured to display an image, a video, and the like. The display screen includes a display panel. The display panel may use a liquid crystal display (LCD), an organic light-emitting diode (OLED), an active-matrix organic light emitting diode (AMOLED), a flexible light-emitting diode (FLED), a mini LED, a micro LED, a micro OLED, a quantum dot light emitting diode (QLED), or the like. In some embodiments, the terminal 100 may include one or N display screens, where N is a positive integer greater than 1.

The terminal 100 may implement a photographing function by using the ISP, the camera 193, the video codec, the GPU, the display screen, the application processor, and the like.

The ISP is configured to process data fed back by the camera. For example, during photographing, after the shutter is opened, light is transferred to a photosensitive element of the camera, an optical signal is converted into an electrical signal, and the photosensitive element of the camera transfers the electrical signal to the ISP for processing, to convert the electrical signal into an image visible to human eyes. The ISP may further perform algorithm-based optimization on the image in terms of noise, brightness, and skin color. The ISP may further optimize parameters such as an exposure and a color temperature of a photographing scenario. In some embodiments, the ISP may be disposed in the camera 193.

The camera 193 is configured to capture a static image or a video. An optical image of an object is generated through a lens and is projected to the photosensitive element. The photosensitive element may be a charge coupled device (CCD) or a complementary metal-oxide-semiconductor (CMOS)-based phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard RGB or YUV format or the like. In some embodiments, the terminal 100 may include one or N cameras, where N is a positive integer greater than 1.

Figure 2:
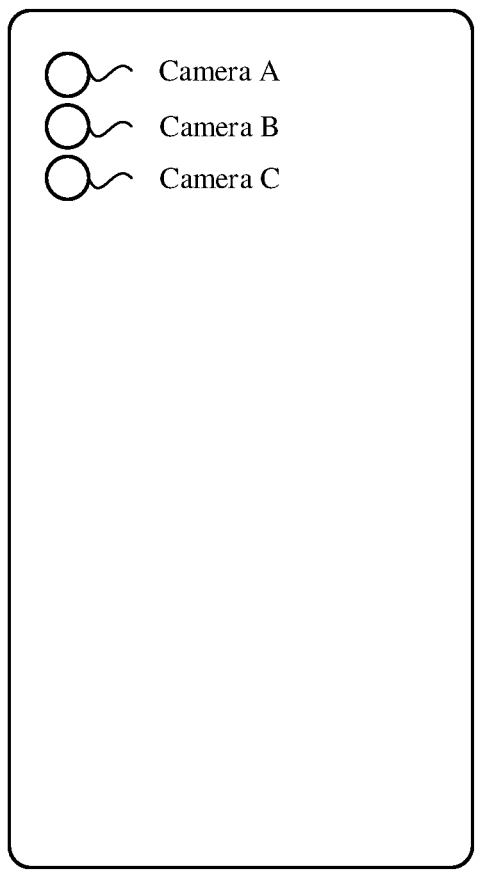
FIG. 2 is a second schematic structural diagram of a terminal according to an embodiment of this disclosure.

For example, the terminal 100 may include a plurality of cameras with different FOVs. For example, as shown in FIG. 2, a camera A, a camera B, and a camera C may be disposed on a rear cover of the terminal 100. The camera A, the camera B, and the camera C may be arranged along a horizontal direction or a vertical direction or in a form of a triangle. In addition, the camera A, the camera B, and the camera C have different FOVs. For example, an FOV of the camera A is smaller than an FOV of the camera B, and the FOV of the camera B is smaller than an FOV of the camera C.

Figure 3:
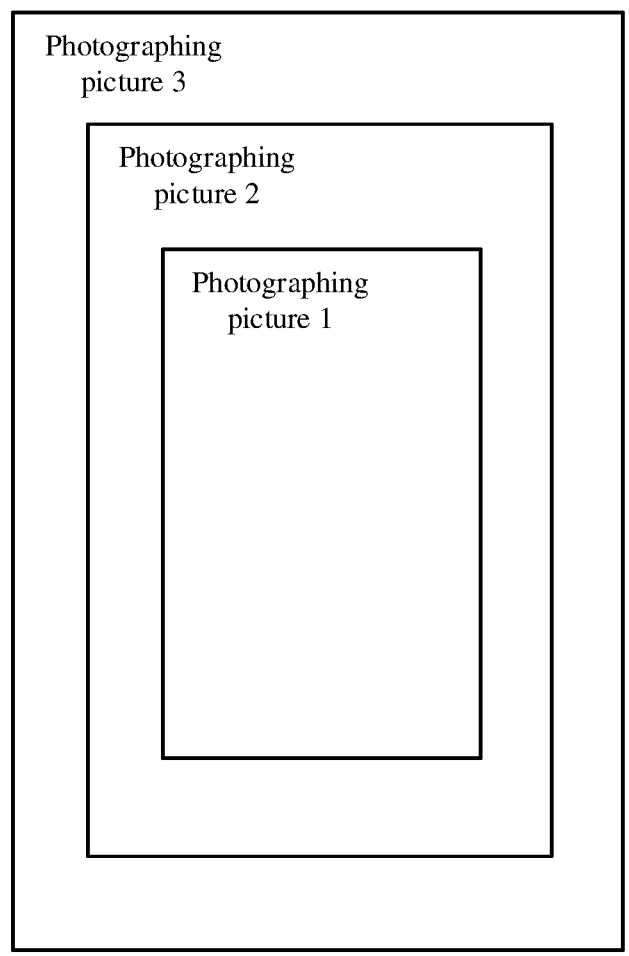
FIG. 3 is a first schematic diagram of a principle of photographing by using a plurality of cameras according to an embodiment of this disclosure.

A camera with a larger FOV can capture a photographing picture with a larger field of vision. In addition, the camera A, the camera B, and the camera C are relatively close to each other. Therefore, it can be considered that centers of photographing pictures of these three cameras coincide. Then, still as shown in FIG. 3, a photographing picture 3 captured by the camera C is the greatest, a photographing picture 2 captured by the camera B is smaller than the photographing picture 3, and a photographing picture 1 captured by the camera A is the smallest. In other words, the photographing picture 3 may include the photographing picture 2 and the photographing picture 1.

In a photographing process, a to-be-photographed object may change dynamically in the photographing picture 1 to the photographing picture 3. In this embodiment of this disclosure, the terminal 100 can determine a target camera with a best photographing effect based on a size and a location of the to-be-photographed object in each photographing picture. In this way, when a currently used camera is not the target camera, the terminal 100 may automatically switch to the target camera for photographing, thereby improving a photographing effect of the to-be-photographed object.

In addition, the digital signal processor is configured to process a digital signal. The digital signal processor not only can process the digital image signal, but also can process another digital signal. For example, when the terminal 100 selects a frequency, the digital signal processor is configured to perform Fourier transformation on frequency energy and the like.

The video codec is configured to compress or decompress a digital video. The terminal 100 can support one or more types of video codecs. In this way, the terminal 100 may play or record videos in a plurality of encoding formats, for example, MPEG-1, MPEG-2, MPEG-3, and MPEG-4.

The NPU is a neural-network (NN) computation processor that rapidly processes input information by using a biological neural network structure, for example, by using a mode of transfer between human brain neurons, and may further perform continuous self-learning. Applications such as intelligent cognition of the terminal 100, for example, image recognition, facial recognition, voice recognition, and text understanding, can be implemented by using the NPU.

The external memory interface 120 may be configured to connect to an external memory card, for example, a micro SD card, to expand a storage capability of the terminal 100. The external memory card communicates with the processor through the external memory interface, to implement a data storage function, for example, to store music, video, and other files in the external memory card.

The internal memory 121 may be configured to store computer executable program code, where the executable program code includes an instruction. The processor 110 runs the instruction stored in the internal memory 121, to perform various function applications and data processing of the terminal 100. The memory 121 may include a program storage area and a data storage area. The program storage area may store an operating system, an application program required by at least one function (for example, a voice playing function or an image playing function), and the like. The data storage area may store data (for example, audio data, a phone book, and the like) created during use of the terminal 100 and other data. In addition, the memory 121 may include a high-speed random access memory, and may further include a non-volatile memory, such as at least one magnetic disk storage device, a flash memory device, another volatile solid state storage device, and a universal flash storage (UFS).

The terminal 100 may implement an audio function, such as music playing and recording, by using the audio module 170, the speaker 170A, the receiver 170B, the microphone 170C, the headset interface 170D, the application processor, and the like.

The audio module is configured to convert digital audio information into an analog audio signal output, and is also configured to convert an analog audio input into a digital audio signal. The audio module may further be configured to encode and decode an audio signal. In some embodiments, the audio module may be disposed in the processor 110, or some function modules of the audio module may be disposed in the processor 110.

The speaker 170A, also referred to as a "loudspeaker", is configured to convert an electrical audio signal into a voice signal. The terminal 100 may be used for listening to music or answering a hands-free call by using the speaker.

The receiver 170B, also referred to as an "earpiece", is configured to convert an electrical audio signal into a voice signal. When a call or voice information is received on the terminal 100, voice can be heard by putting the receiver near a human ear.

The microphone 170C, also referred to as a "voice tube" or a "megaphone", is configured to convert a voice signal into an electrical signal. When making a call or sending voice information, a user may put the microphone near the mouth and speak, to input a voice signal into the microphone. The terminal 100 may be provided with at least one microphone. In some embodiments, the terminal 100 may be provided with two microphones, which may further implement a denoising function in addition to voice signal collection. In some embodiments, the terminal 100 may alternatively be provided with three, four, or more microphones, which implement voice signal collection and denoising, and may further identify a source of voice, to implement a directional recording function.

The headset interface 170D is configured to connect to a wired headset. The headset interface may be a USB interface, or may be a standard 3.5 mm open mobile terminal platform (OMTP) interface, or a standard cellular telecommunications industry association of the USA (CTIA) interface.

The pressure sensor 180A is configured to sense a pressure signal, and may convert the pressure signal into an electrical signal. In some embodiments, the pressure sensor may be disposed on the display screen. There are many types of pressure sensors, for example, a resistive pressure sensor, an inductive pressure sensor, a capacitive pressure sensor, and the like. A capacitive pressure sensor may include at least two parallel plates that contain a conductive material. When force is exerted on the pressure sensor, a capacitance between electrodes is changed. The terminal 100 determines a strength of the pressure based on a change of the capacitance. When a touch operation is exerted on the display screen, the terminal 100 detects a strength of the touch operation by using the pressure sensor. The terminal 100 may also calculate a touch position based on a signal detected by the pressure sensor. In some embodiments, touch operations that are exerted on a same touch position but have different touch operation strengths may correspond to different operation instructions. For example, when a touch operation with a touch operation strength less than a first pressure threshold is exerted on an icon of an SMS message application, an instruction for viewing an SMS message is executed. When a touch operation with a touch operation strength greater than or equal to the first pressure threshold is exerted on the icon of the SMS message application, an instruction for creating an SMS message is executed.

The gyroscope sensor 180B may be configured to determine a movement posture of the terminal 100. In some embodiments, angular velocities of the terminal 100 relative to three axes (that is, x, y, and z axes) may be determined by using the gyroscope sensor. The gyroscope sensor may be configured to implement image stabilization during photographing. For example, when the shutter is pressed, the gyroscope sensor detects an angle of shaking of the terminal 100; and calculates, based on the angle, a distance that needs to be compensated by a lens module, to counteract the shaking of the terminal 100 through a counter motion of the lens, thereby implementing image stabilization. The gyroscope sensor may further be used in navigation and motion sensing gaming scenarios.

The barometric pressure sensor 180C is configured to measure an atmospheric pressure. In some embodiments, the terminal 100 calculates an altitude based on an atmospheric pressure value measured by the barometric pressure sensor, to assist in positioning and navigation.

The magnetic sensor 180D includes a Hall effect sensor. The terminal 100 may detect opening/closing of a flip leather case by using the magnetic sensor. In some embodiments, when the terminal 100 is a flip phone, the terminal 100 may detect opening and closing of a clamshell by using the magnetic sensor. In this way, based on a detected open/closed state of the leather case or a detected open/closed state of the clamshell, attributes such as auto-unlocking when the flip phone is flipped open can be set.

The acceleration sensor 180E may detect magnitude of accelerations of the terminal 100 in all directions (usually along three axes). When the terminal 100 is still, the acceleration sensor may detect a magnitude and a direction of gravity. The acceleration sensor may further be configured to identify a posture of the terminal, and is applied to landscape/portrait mode switching, a pedometer, and other applications.

The distance sensor 180F is configured to measure a distance. The terminal 100 may measure a distance by using an infrared or laser ray. In some embodiments, in a photographing scenario, the terminal 100 may measure a distance by using the distance sensor, to implement rapid focusing.

The optical proximity sensor 180G may include a light emitting diode (LED), an optical detector, and the like, such as a photodiode. The light emitting diode may be an infrared light emitting diode. The terminal 100 emits infrared light by using the light emitting diode. The terminal 100 detects reflected infrared light from a nearby object by using the photodiode. When detecting sufficient reflected light, the terminal 100 can determine that there is an object near the terminal 100. When detecting insufficient reflected light, the terminal 100 can determine that there is no object near the terminal 100. The terminal 100 can detect, by using the optical proximity sensor, that the user holds the terminal 100 close to an ear during a call, so as to automatically turn off a screen, thereby saving power. The optical proximity sensor may also be used for auto-unlocking and screen locking in a leather case mode and a pocket mode.

The ambient light sensor 180L is configured to sense brightness of ambient light. The terminal 100 may adaptively adjust brightness of the display screen based on the sensed brightness of the ambient light. The ambient light sensor may also be configured to automatically adjust white balance during photographing. The ambient light sensor may further be configured to detect, in coordination with the optical proximity sensor, whether the terminal 100 is in a pocket, to prevent touch by mistake.

The fingerprint sensor 180H is configured to collect a fingerprint. By using a feature of the collected fingerprint, the terminal 100 may implement unlocking via the fingerprint, access an application lock, take a photo via the fingerprint, answer a call via the fingerprint, and the like.

The temperature sensor 180J is configured to detect a temperature. In some embodiments, the terminal 100 detects a temperature by using the temperature sensor, to execute a temperature processing policy. For example, when a temperature reported by the temperature sensor exceeds a threshold, the terminal 100 degrades performance of a processor near the temperature sensor, to reduce power consumption and implement thermal protection.

The touch sensor 180K is also referred to as a "touch panel". The touch sensor 180K may be disposed on the display screen, and is configured to detect a touch operation exerted on or near the touch sensor 180K. The touch sensor 180K may transfer the detected touch operation to the application processor, to determine a touch event type; and provide a visual output related to the touch operation by using the display screen.

The bone conduction sensor 180M may obtain a vibration signal. In some embodiments, the bone conduction sensor may obtain a vibration signal of a vibrating bone of a vocal-cord part of a human body. The bone conduction sensor may also be in contact with pulses of the human body, to receive blood pressure fluctuating signals. In some embodiments, the bone conduction sensor may alternatively be disposed in a headset. The audio module 170 may obtain a voice signal through parsing the vibration signal of the vibrating bone of the vocal-cord part of the human body obtained by the bone conduction sensor, to implement a voice function. The application processor may obtain heart rate information through parsing the blood pressure fluctuating signals obtained by the bone conduction sensor, to implement a heart rate detection function.

The key 190 includes a power on/off key, a volume key, and the like. The key may be a mechanical key, or may be a touch key. The terminal 100 receives a key input, to generate a key signal input that is related to user setting or function control of the terminal 100.

The motor 191 may generate a vibration alert. The motor may be configured to produce an incoming call vibration alert, and may also be configured to provide a touch vibration feedback. For example, touch operations exerted on different applications (such as photographing and audio playing) may correspond to different vibration feedback effects. Touch operations exerted on different regions on the display screen may also correspond to different vibration feedback effects. Different application scenarios (for example, time reminder, information receiving, alarm, and gaming) may also correspond to different vibration feedback effects. A touch vibration feedback effect may also be customized.

The indicator 192 may be an indicator light, may be configured to indicate a charging status and a battery level change, and may also be configured to indicate a message, a missed call, a notification, and the like.

The SIM card interface 195 is configured to connect to a subscriber identity module (SIM). The SIM card may be inserted into the SIM card interface or pulled out from the SIM card interface, to come into contact with or be separated from the terminal 100. The terminal 100 may support one or N SIM card interfaces, where N is a positive integer greater than 1. The SIM card interface can support a nano-SIM card, a micro-SIM card, a SIM card, and the like. A plurality of cards may be inserted into the same SIM card interface at a same time. The plurality of cards may be of a same type or may be of different types. The SIM card interface may also be compatible with different types of SIM cards. The SIM card interface may also be compatible with an external memory card. The terminal 100 interacts with a network by using the SIM card, to implement functions such as call and data communication. In some embodiments, the terminal 100 uses an eSIM, that is, an embedded SIM card. The eSIM card may be embedded in the terminal 100, and cannot be separated from the terminal 100.

A software system of the terminal 100 may use a hierarchical architecture, an event driven architecture, a microkernel architecture, a microservices architecture, or a cloud architecture. In this embodiment of the present invention, a software structure of the terminal 100 is described illustratively by using an Android system with a hierarchical architecture as an example.

Figure 4:
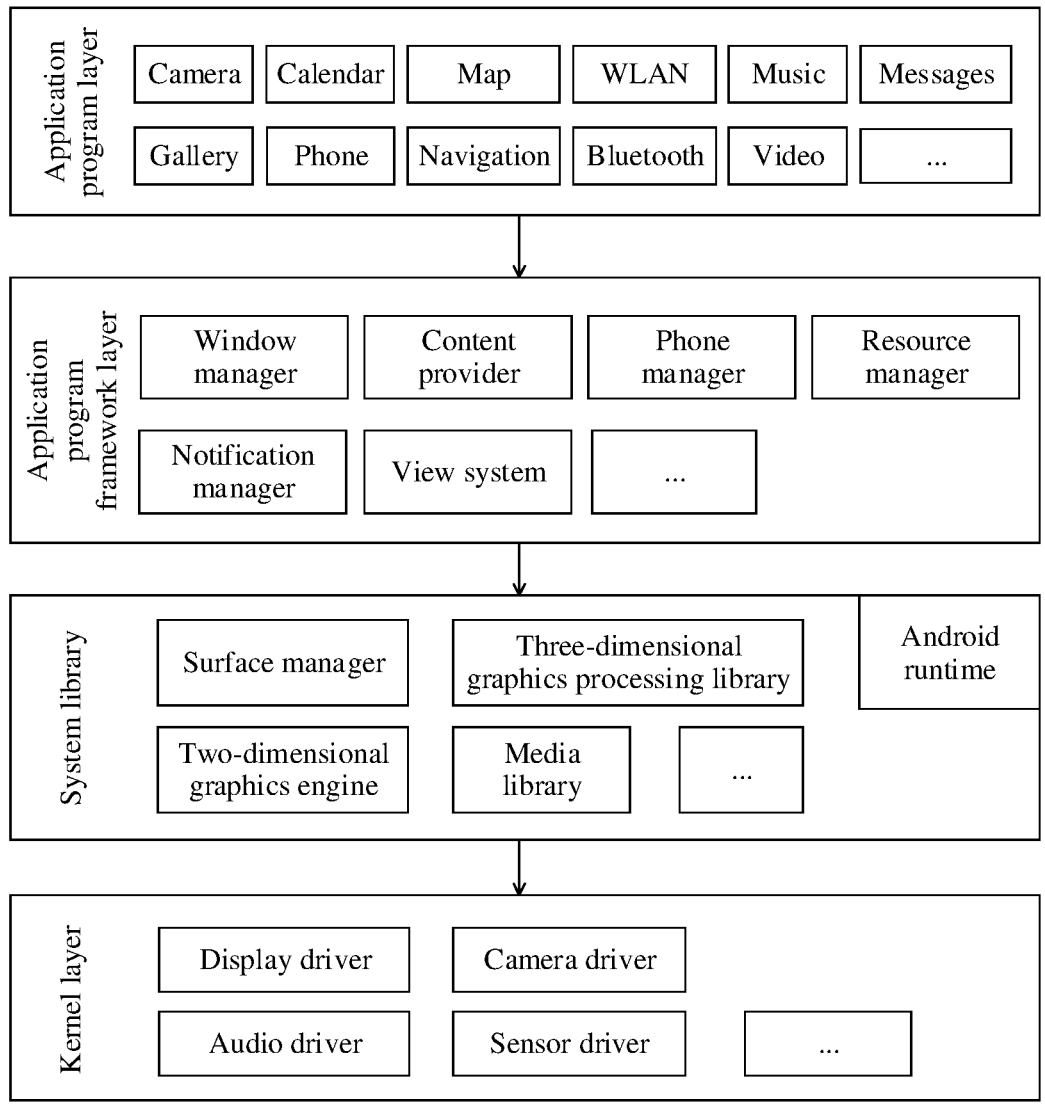
FIG. 4 is a schematic structural diagram of an operating system in a terminal according to an embodiment of this disclosure.

FIG. 4 is a structural block diagram of software of a terminal 100 according to an embodiment of the present invention.

In a hierarchical architecture, software is divided into several layers, and each layer has a clear role and clear division of work. Layers communicate with each other through an interface. In some embodiments, an Android system is divided into four layers, which are an application program layer, an application program framework layer, an Android runtime and a system library, and a kernel layer.

The application program layer may include a series of application program packages.

As shown in FIG. 4, the application program packages may include application programs such as camera, gallery, calendar, phone, map, navigation, WLAN, bluetooth, music, video, and SMS messaging.

These application programs may be system-level applications (such as desktop, SMS messaging, phone, calendar, and contacts) of an operating system, or may be common-level applications (such as WeChat and Taobao). A system-level application usually means that the application has a system-level permission and can obtain various system resources. A common-level application usually means that the application has a common permission and cannot obtain some system resources, or can obtain some system resources only with authorization from a user. A system-level application may be an application pre-installed in a mobile phone. A common-level application may be an application pre-installed in a mobile phone, or may be an application installed subsequently by a user.

The application program framework layer provides an application programming interface (API) and a programming framework for the application program layer. The application program framework layer includes some predefined functions.

As shown in FIG. 4, the application program framework layer may include a window manager, a content provider, a view system, a phone manager, a resource manager, a notification manager, and the like.

The window manager is configured to manage a window program. The window manager can obtain a size of a display screen, determine whether there is a status bar, lock the screen, take a snapshot of the screen, and the like.

The content provider is configured to store and obtain data, and allow the data to be accessible by an application program. The data may include a video, an image, audio, dialed and received calls, a browsing history and a bookmark, a phone book, and the like.

The view system includes a visual control, for example, a control for displaying a character and a control for displaying a picture. The view system may be configured to construct an application program. A display interface may include one or more views. For example, a display interface including an SMS message notification icon may include a view displaying a character and a view displaying a picture.

The phone manager is configured to provide a communication function of the terminal 100, for example, call status management (including calling up, hang-up, and the like).

The resource manager provides various resources for an application program, for example, a localized character string, an icon, a picture, a layout file, and a video file.

The notification manager allows an application program to display notification information in the status bar, and may be configured to deliver a notification-type message which disappears automatically after staying for a short time, without requiring interaction from the user. For example, the notification manager is configured to notify that downloading is completed, provide a message reminder, and the like. The notification manager may alternatively provide a notification in a top status bar of the system in a form of a graph or scrollbar text. For example, a notification concerning an application program running in a background may be displayed on the screen in a form of a dialog box. For example, text information is displayed in the status bar, an alert tone is provided, the terminal vibrates, and an indicator flashes.

The Android runtime includes a kernel library and a virtual machine. The Android runtime is responsible for scheduling and management of the Android system.

The kernel library includes two parts: One part is a performance function that needs to be called by a Java language, and the other part is an Android kernel library.

The application program layer and the application program framework layer run in the virtual machine. The virtual machine executes Java files of the application program layer and the application program framework layer as binary files. The virtual machine is configured to perform functions such as object lifecycle management, stack management, thread management, security and exception management, and garbage collection.

The system library may include a plurality of function modules, for example, a surface manager, a media librar(ies), a three-dimensional graphics processing library OpenGL ES, and a 2D graphics engine SGL.

The surface manager is configured to manage a display subsystem and fuse a 2D layer and a 3D layer for a plurality of application programs.

The media library supports playback and recording of audio and video in a plurality of common formats, static image files, and the like. The media library can support a plurality of audio and video encoding formats, such as MPEG4, H.264, MP3, AAC, AMR, JPG, and PNG.

The OpenGL ES is configured to implement three-dimensional graphics drawing, image rendering and synthesis, layer processing, and the like.

SGL is a drawing engine for 2D drawing.

The kernel layer is a layer between hardware and software. The kernel layer includes at least a display driver, a camera driver, an audio driver, and a sensor driver.

The following illustratively describes a workflow of the software and the hardware of the terminal 100 with reference to a capturing and photographing scenario.

When the touch sensor receives a touch operation, a corresponding hardware interrupt is sent to the kernel layer. The kernel layer may process the touch operation into an original input event (including information such as touch coordinates and a timestamp of the touch operation). The original input event is stored in the kernel layer. The application program framework layer obtains the original input event from the kernel layer, and identifies a control corresponding to the input event. For example, the touch operation is a single-tap touch operation, and a control corresponding to the single-tap operation is a control of an icon of a camera application. An interface of the application framework layer is called to start the camera application, further calls the kernel layer to start the camera driver, and captures each frame of photographing picture by using a camera.

Figure 5:
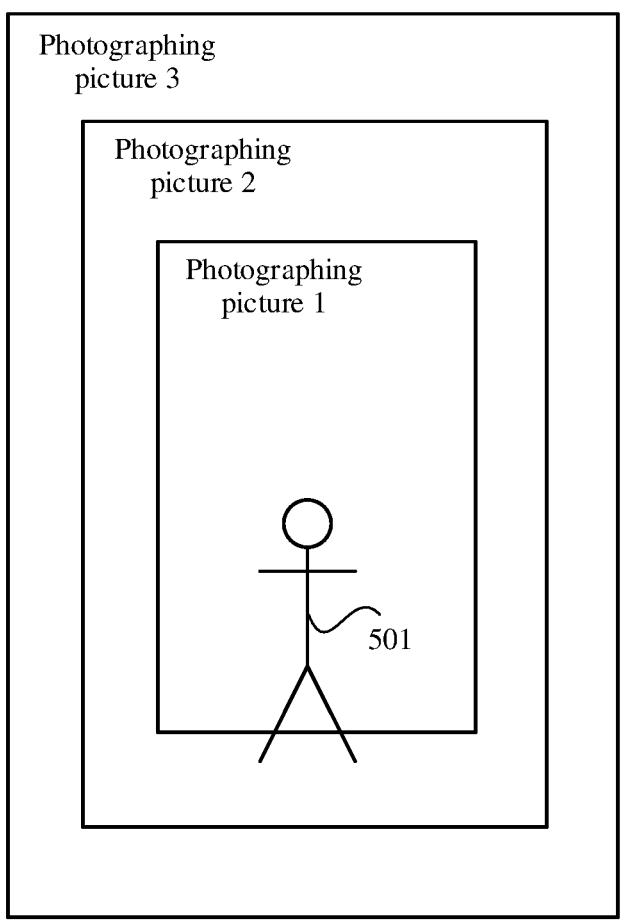
FIG. 5 is a second schematic diagram of a principle of photographing by using a plurality of cameras according to an embodiment of this disclosure.

If the terminal 100 includes a plurality of cameras (for example, the foregoing camera A, camera B, and camera C), the terminal 100 may first enable one of the cameras (for example, the camera A). After enabling the camera A, the terminal may collect each frame of photographing picture (which is referred to as a photographing picture 1 in the following embodiment) captured by the camera A, and display the photographing picture 1 on the display screen 194. Then the terminal can determine a to-be-photographed object in the photographing picture 1. For example, as shown in FIG. 5, a person identified from the photographing picture 1 may be considered as a to-be-photographed object 501.

After the terminal 100 determines the to-be-photographed object 501, the terminal 100 may track a change status of the to-be-photographed object 501 in the photographing picture 1 in real time, for example, parameters such as a location and a size of the to-be-photographed object 501. In this case, although the terminal 100 has not enabled the camera B and the camera C, because parameters such as a location and an FOV of each camera are invariable, the terminal 100 not only can determine the location and the size of the to-be-photographed object 501 in the photographing picture 1, but also can determine a location and a size of the to-be-photographed object 501 in a photographing picture (that is, a photographing picture 2) of the camera B, and a location and a size of the to-be-photographed object 501 in a photographing picture (that is, a photographing picture 3) of the camera C.

In this way, the terminal 100 can determine, based on the location and the size of the to-be-photographed object 501 in each photographing picture, a camera that can ensure a photographing effect of the to-be-photographed object 501. For example, if the to-be-photographed object 501 has moved out of the photographing picture 1 of the camera A, the terminal 100 may switch from the currently enabled camera A to the camera B or the camera C with a larger FOV, to automatically and intelligently help the user switch to a proper camera to photograph the to-be-photographed object in a photographing process, thereby improving a photographing effect of to-be-photographed object.

It should be noted that the photographing picture 1 is a photographing picture generated by the camera A by using all photosensitive elements of the camera A at a default standard focal length. Similarly, the photographing picture 2 is a photographing picture generated by the camera B by using all photosensitive elements of the camera B at a default standard focal length, and the photographing picture 3 is a photographing picture generated by the camera C by using all photosensitive elements of the camera C at a default standard focal length. A standard focal length of a camera is a minimum focal length supported by the camera. Using the photographing picture 3 as an example, the user may manually increase a focal length of the camera C; and in this case, the terminal 100 may acquire some content in the photographing picture 3 through digital zooming, use the content as a new photographing picture (for example, a photographing picture 3'), and display the photographing picture 3' on a preview interface. The photographing picture 3' is some content in the photographing picture 3. Therefore, although a field of vision presented by the photographing picture 3' is narrower, a resolution of the photographing picture 3' is also decreased.

For ease of understanding, the following describes, in detail with reference to accompanying drawings, a camera switching method according to an embodiment of this disclosure. In all the following embodiments, descriptions are provided by using an example in which a terminal is a mobile phone.

Figure 6A:
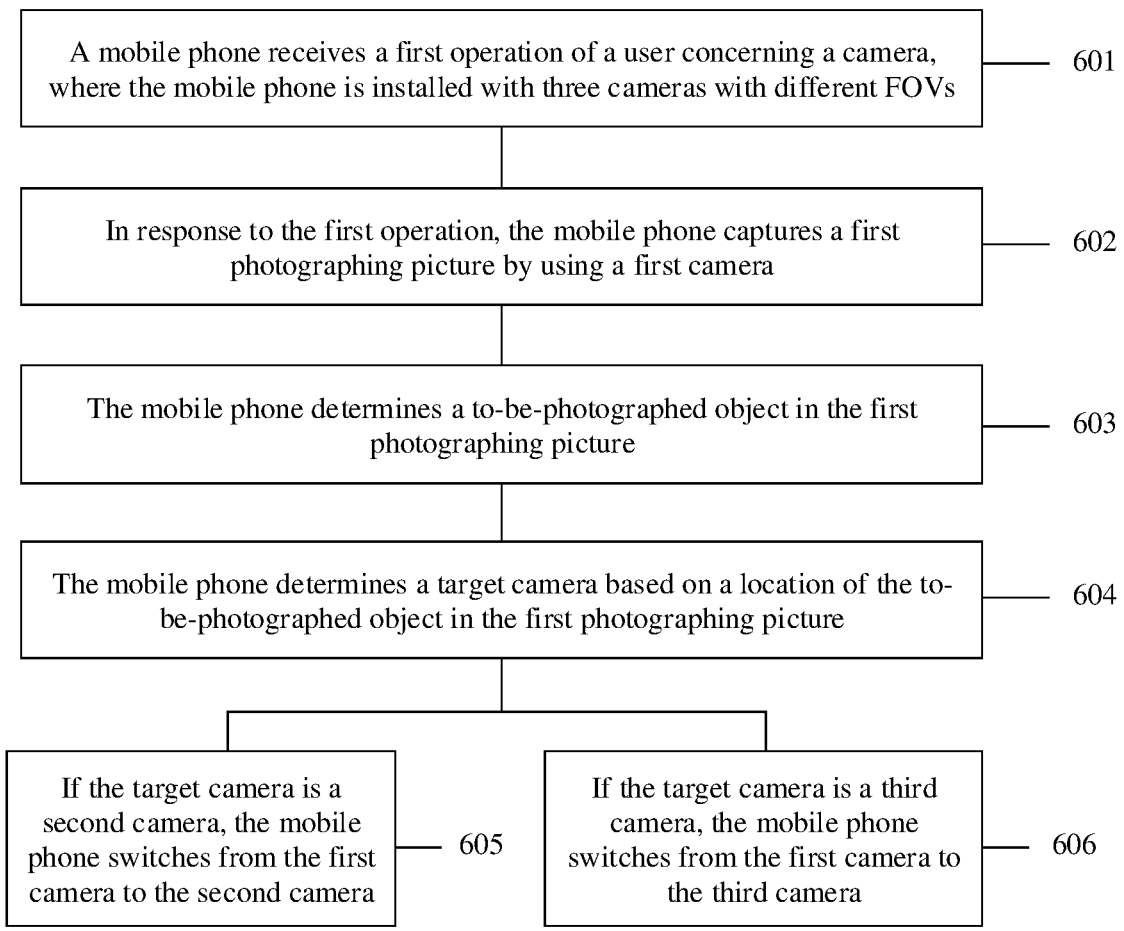
FIG. 6A is a first schematic flowchart of a camera switching method for a terminal according to an embodiment of this disclosure.

FIG. 6A is a schematic flowchart of a camera switching method according to an embodiment of this disclosure. As shown in FIG. 6A, the camera switching method may include the following steps.

S601. A mobile phone receives a first operation of a user concerning a camera, where the mobile phone is installed with three cameras with different FOVs.

The first operation may be any operation of enabling the camera by the user. For example, the first operation may specifically be tapping on an icon of a camera APP or an operation of enabling the camera APP from another APP. Alternatively, the first operation may be any operation of starting recording a video by the user. For example, the first operation may specifically be an operation of tapping on a recording button by the user after enabling the camera APP. This is not limited in any manner in this embodiment of this disclosure.

It should be noted that in this embodiment of this disclosure, the mobile phone may be installed with N (where N is an integer greater than 1) cameras. The N cameras have different FOVs. In other words, photographing pictures photographed by the mobile phone by using different cameras have different fields of vision. The N cameras may be disposed on a rear cover of the mobile phone and serve as rear-facing cameras, or may be disposed on a front panel of the mobile phone and serve as front-facing cameras. To facilitate description of the camera switching method provided in this embodiment of this disclosure, three cameras A, B, and C with different FOVs are used as an example for subsequent description in this embodiment.

The camera A has a smallest FOV, the camera C has a greatest FOV, and an FOV of the camera B is between the FOV of the camera A and the FOV of the camera C. In this case, as shown in FIG. 3, a photographing picture 1 captured by the mobile phone by using the camera A has a smallest field of vision, a photographing picture 3 captured by the mobile phone by using the camera C has a greatest field of vision, and a maximum field of vision of a photographing picture 2 captured by the mobile phone by using the camera B is between the field of vision of the photographing picture 1 and the field of vision of the photographing picture 3.

S602. The mobile phone captures a first photographing picture by using a first camera.

After receiving the first operation, the mobile phone may use a default camera or randomly select a camera (that is, the first camera) for photographing. After the first camera starts photographing, the first camera may send a captured photographing picture (in this disclosure, the picture captured by the first camera is referred to as a first photographing picture) to the mobile phone, and the mobile phone displays the first photographing picture on a display screen.

Figure 7A:
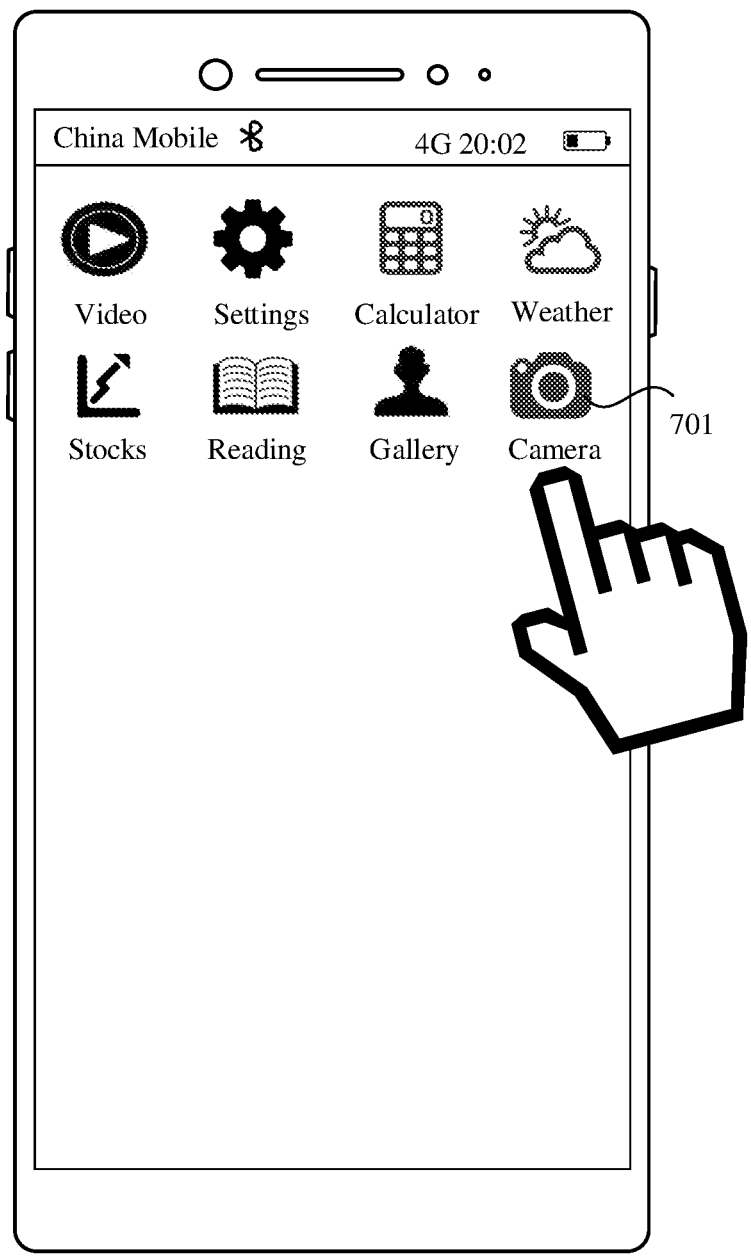
FIG. 7(a) and FIG. 7(b) are first schematic diagrams of a scenario of a camera switching method for a terminal according to an embodiment of this disclosure.

For example, as shown in FIG. 7(a), after the user taps on an icon 701 of a camera APP, the mobile phone can detect that the user performs the first operation to enable a camera. Further, the mobile phone may select one of the camera A, the camera B, and the camera C as the first camera to start working. For example, the mobile phone may use the camera B with an intermediate FOV as the first camera, start the camera B by calling the camera driver, and capture the first photographing picture by using the camera B. In this case, as shown in FIG. 7(b), the mobile phone may display each frame of first photographing picture 702 captured by the camera B on a preview interface of the camera APP.

Figure 7B:
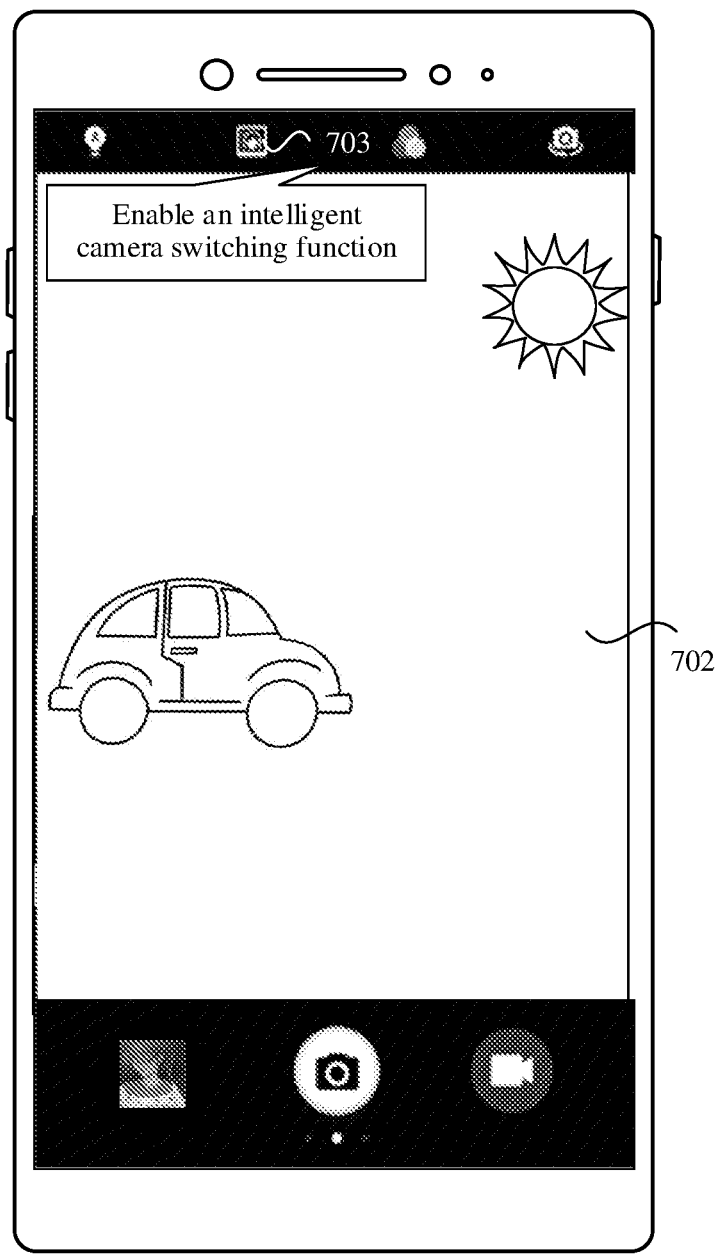

In addition, as shown in FIG. 7(b), the mobile phone may also provide an on/off button 703 on the preview interface of the camera APP. When detecting that the user turns on the on/off button 703, the mobile phone may automatically determine and switch to a camera with a better photographing effect by taking the following steps S603 to S606. Otherwise, the mobile phone may continue using the first camera to capture the first photographing picture.

S603. The mobile phone can determine a to-be-photographed object in the first photographing picture.

Figure 8:
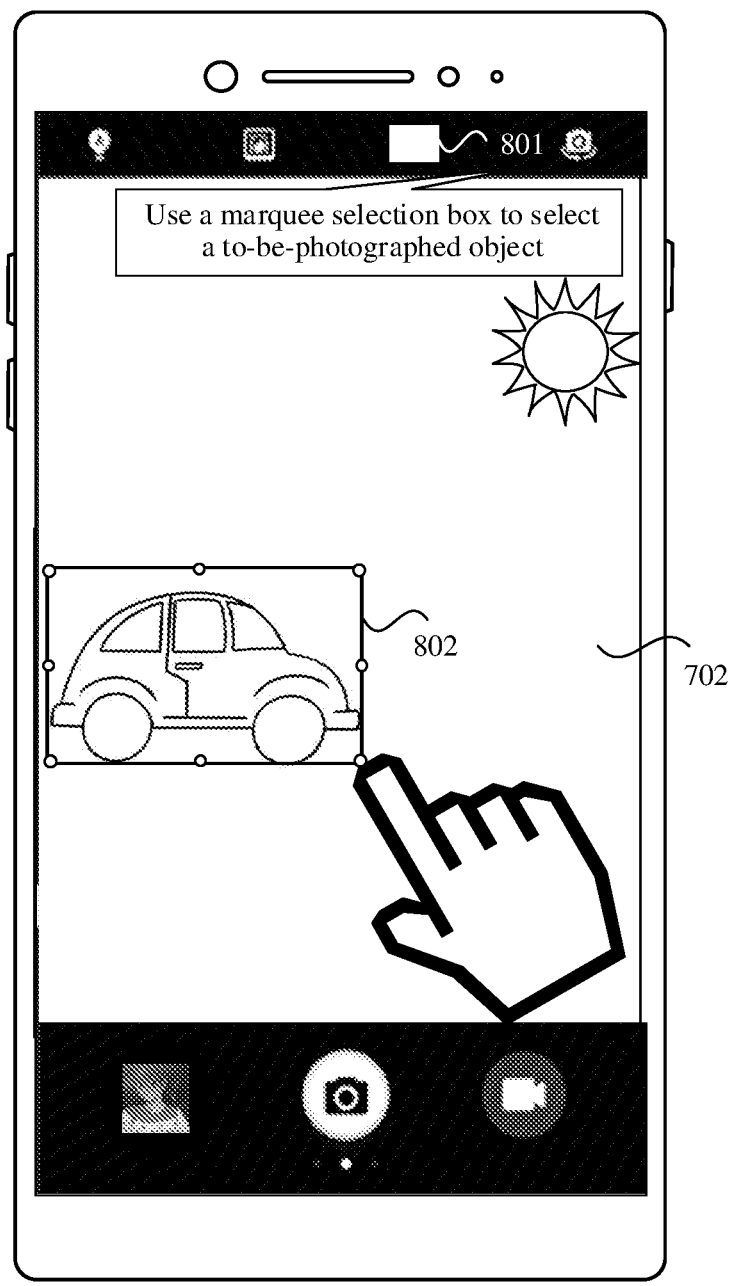
FIG. 8 is a second schematic diagram of a scenario of a camera switching method for a terminal according to an embodiment of this disclosure.

The first photographing picture 702 captured by the first camera can be displayed on the display screen of the mobile phone in real time. Therefore, the user can manually select a to-be-photographed object in the first photographing picture 702. For example, as shown in FIG. 8, a marquee selection button 801 may be disposed on the preview interface of the camera APP. After the user taps on the marquee selection button 801, the mobile phone may provide the user with a marquee selection box 802 with a variable location and size. The user may drag the marquee selection box 802 to select a to-be-photographed object in the first photographing picture 702. For example, if detecting that the user selects a car in the first photographing picture 702 by using the marquee selection box 802, the mobile phone may extract an image in the marquee selection box 802 and perform image recognition to obtain an image feature in the marquee selection box 802, to determine that the to-be-photographed object in the first photographing picture 702 is the car.

Certainly, the user may alternatively select an expected to-be-photographed object in the first photographing picture 702 in a tapping, double-tapping, touching and holding, or hard pressing manner. This is not limited in any manner in this embodiment of this disclosure.

Alternatively, after obtaining the first photographing picture, the mobile phone may automatically perform image recognition on the first photographing picture, to determine the to-be-photographed object in the first photographing picture based on a recognition result. For example, the mobile phone may consider, as the to-be-photographed object, a face recognized from the first photographing picture; or consider, as the to-be-photographed object, a person or an object located at a center of the first photographing picture; or consider, as the to-be-photographed object, a person or an object that occupies an area in a specific proportion to an area of the first photographing picture. This is not limited in any manner in this embodiment of this disclosure.

After determining the to-be-photographed object in the first photographing picture 702, the mobile phone may notify the user of the to-be-photographed object in the first photographing picture 702 by adding a box, voice, or text, by highlighting the object, or the like. In addition, if the user is unsatisfied with the to-be-photographed object determined automatically by the mobile phone, the user may change the to-be-photographed object. For example, the user may drag a box displayed around the to-be-photographed object by the mobile phone to an expected location, where an image in the box after the dragging can be used as a new to-be-photographed object.

In addition, after determining the to-be-photographed object in the first photographing picture, the mobile phone may track a location and a size of the to-be-photographed object in the first photographing picture in real time. For example, after determining that the to-be-photographed object in the first photographing picture 702 is a car, the mobile phone can obtain an image feature of the car. When the mobile phone continuously refreshes the first photographing picture 702 by using the camera B, the mobile phone can determine parameters such as a location and a size of the car in a refreshed first photographing picture 702 based on the image feature of the car.

S604. The mobile phone determines a target camera based on the location and the size of the to-be-photographed object in the first photographing picture.

In step S604, the mobile phone may first determine, based on the location of the to-be-photographed object in the first photographing picture, whether it is necessary to switch between cameras. If it is necessary to switch between cameras, the mobile phone may further determine a specific camera to be used as a to-be-switched-to target camera.

Figure 6B:
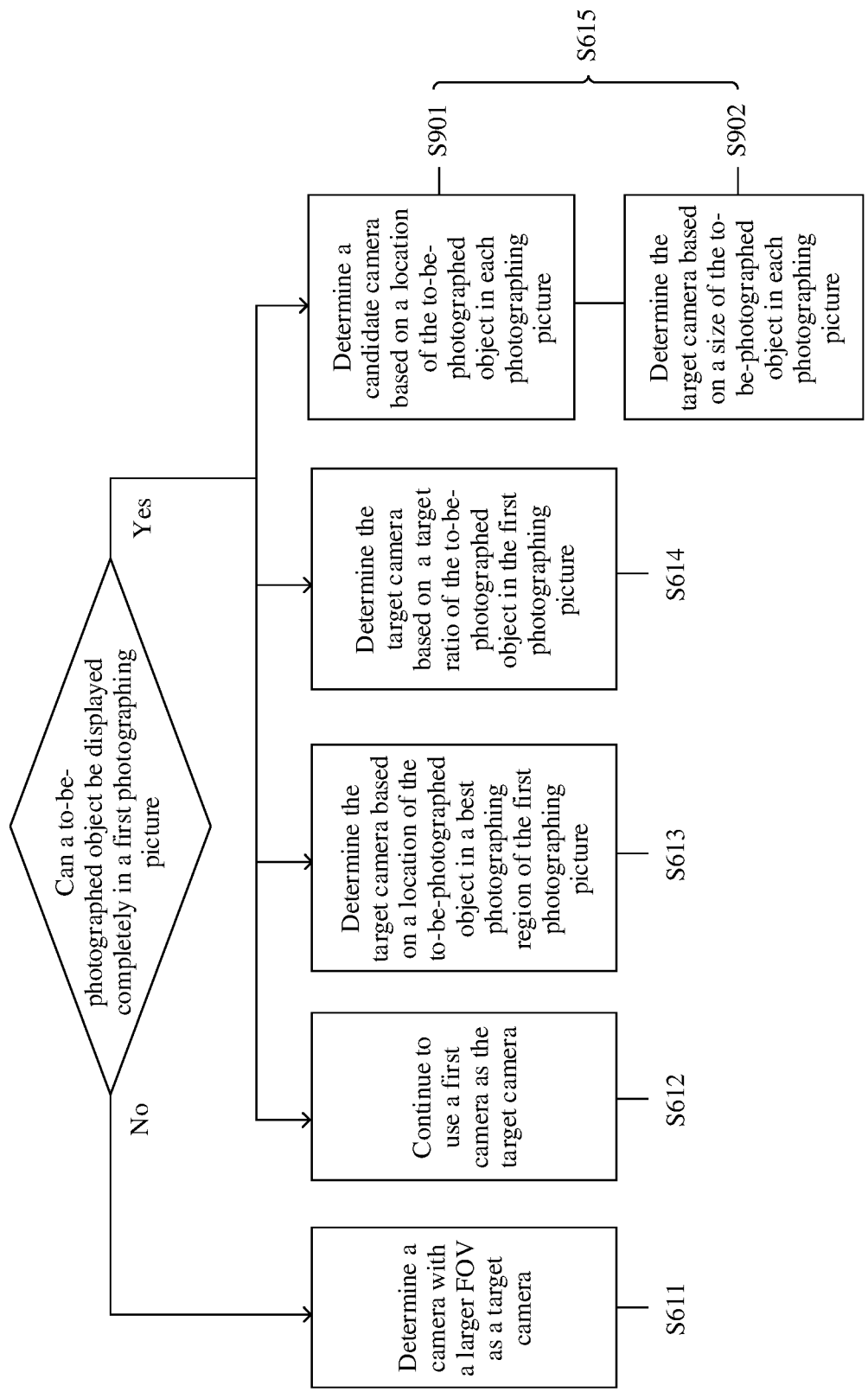
FIG. 6B is a second schematic flowchart of a camera switching method for a terminal according to an embodiment of this disclosure.
Figure 9A:
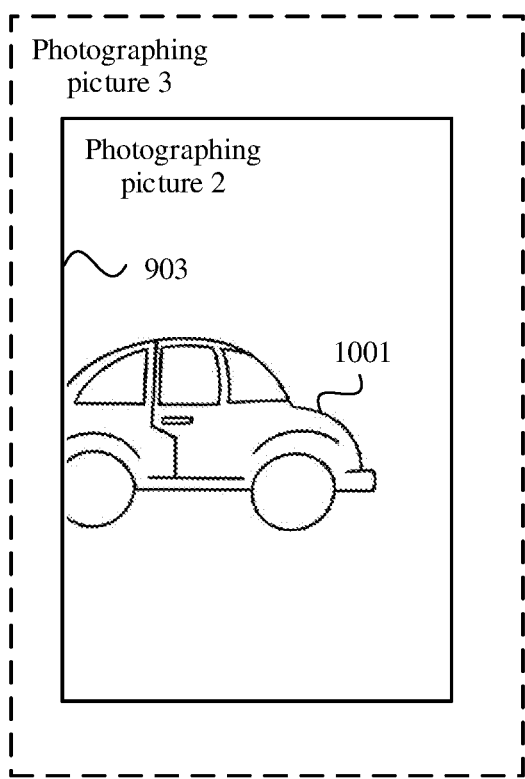
FIG. 9(a) and FIG. 9(b) are third schematic diagrams of a scenario of a camera switching method for a terminal according to an embodiment of this disclosure.
Figure 9B:
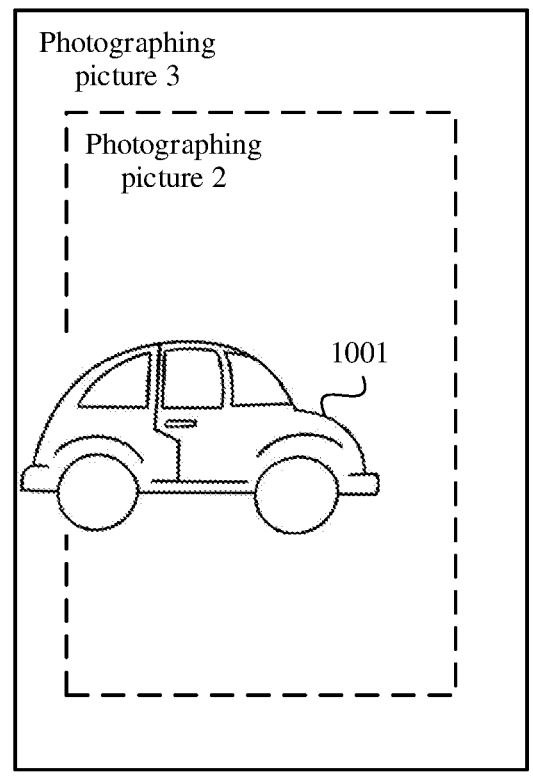

For example, as shown in FIG. 6B, the mobile phone may first determine, based on the location of the to-be-photographed object in the first photographing picture, whether the to-be-photographed object can be displayed completely in the first photographing picture. For example, the first photographing picture is the photographing picture 2 photographed by the camera B. As shown in FIG. 9(a), after determining a to-be-photographed object 1001, the mobile phone may further determine whether each boundary line of the photographing picture 2 coincides with the to-be-photographed object 1001. If a boundary line coincides with the to-be-photographed object 1001, it indicates that the to-be-photographed object cannot be displayed completely in the first photographing picture. In this case, the mobile phone may continue to perform step S611 in FIG. 6B. For example, in FIG. 9, a boundary line 903 of the photographing picture 2 coincides with the to-be-photographed object 1001, and a coincident part occupies over 30% of the boundary line 903. It indicates that the to-be-photographed object 1001 cannot be displayed completely in the photographing picture 2, resulting in a poor photographing effect of the to-be-photographed object 1001. Therefore, as shown in FIG. 9(*b*), the mobile phone can determine a camera with a larger FOV (for example, the camera C) as the to-be-switched-to target camera, so that the to-be-photographed object 1001 can be displayed more completely in the photographing picture 3 photographed by the camera C.

Figure 10A:
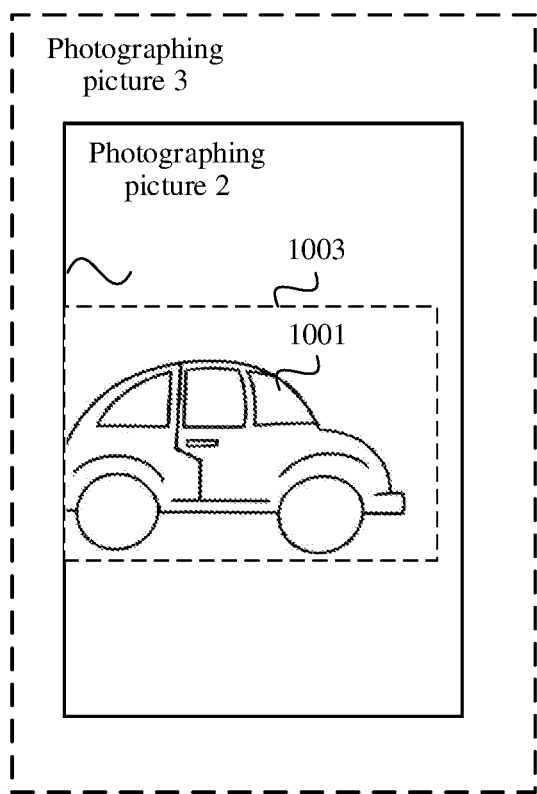
FIG. 10(a) and FIG. 10(b) are fourth schematic diagrams of a scenario of a camera switching method for a terminal according to an embodiment of this disclosure.
Figure 10B:
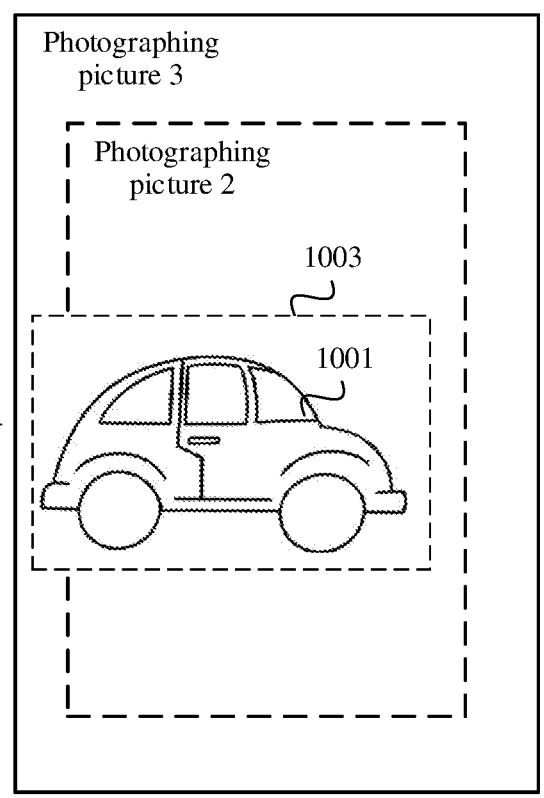

Alternatively, the to-be-photographed object 1001 is usually an irregular graph in a photographing picture. Therefore, as shown in FIG. 10(*a*) and FIG. 10(*b*), the mobile phone may set a regular shaped placeholder region 1002 for the to-be-photographed object 1001. The placeholder region 1002 is usually a rectangular region that can accommodate the to-be-photographed object 1001. In this case, the mobile phone can determine a degree of coincidence between the placeholder region 1002 and each boundary line of the photographing picture 2, to determine whether it is necessary to switch between cameras. For example, still as shown in FIG. 10(*a*), when a boundary line of the placeholder region 1002 completely coincides with the boundary line 903 of the photographing picture 2, it indicates that the to-be-photographed object 1001 cannot be displayed completely in the photographing picture 2. Then, as shown in FIG. 10(*b*), the mobile phone can determine a camera with a larger FOV (for example, the camera C) as the target camera, so that the to-be-photographed object 1001 is displayed closer to a center of the photographing picture 3.

Certainly, if the currently used first camera (for example, the camera B) is already a camera with a greatest FOV, it indicates that the target camera still cannot be displayed completely even in a greatest field of vision of the mobile phone. Then the mobile phone does not need to switch to another camera. In this case, the target camera is still the first camera being used.

In some other embodiments of this disclosure, still as shown in FIG. 6B, if the to-be-photographed object 1001 (or the placeholder region 1002 of the to-be-photographed object 1001) does not coincide with each boundary line of the photographing picture 2, it indicates that the current photographing picture 2 can completely display the to-be-photographed object 1001. Then the mobile phone may continue to perform any of steps S612 to S615. In other words, when the to-be-photographed object can be displayed completely in the first photographing picture, this embodiment of this disclosure provides four manners for determining the to-be-switched-to target camera.

Manner 1 (that is, Step S612)

If the to-be-photographed object 1001 (or the placeholder region 1002 of the to-be-photographed object 1001) does not coincide with each boundary line of the photographing picture 2, it indicates that the current photographing picture 2 can completely display the to-be-photographed object 1001, and a case that the to-be-photographed object 1001 is not displayed completely will not occur. Therefore, the mobile phone may continue to use, as the target camera, the first camera being used (that is, the camera B).

Manner 2 (that is, Step S613)

In manner 2, because an image at an edge of a photographing picture photographed by a camera is prone to be distorted, a region located at a center of each photographing picture can be considered as a best photographing region. In this case, if the photographing picture 2 can completely display the to-be-photographed object 1001, the mobile phone may further determine, based on a location of the to-be-photographed object 1001, whether the to-be-photographed object 1001 is located within a best photographing region of the photographing picture 2. If the to-be-photographed object 1001 is located within the best photographing region of the photographing picture 2, it indicates that the to-be-photographed object 1001 has a relatively good photographing effect in the photographing picture 2. Therefore, the mobile phone does not need to switch to another camera. In this case, the target camera is still the camera B being used.

Correspondingly, if the to-be-photographed object 1001 has gone beyond the best photographing region of the photographing picture 2, an edge of the to-be-photographed object 1001 may be distorted if the camera B is still used for photographing. Therefore, the mobile phone can determine a camera with a larger FOV (for example, the camera C) as the to-be-switched-to target camera, so that the to-be-photographed object 1001 can be displayed in the photographing picture 3 which has a larger best photographing region.

Manner 3 (that is, Step S614)

In manner 3, if the photographing picture 2 can completely display the to-be-photographed object 1001, the mobile phone may further determine a target ratio of the to-be-photographed object 1001 in the photographing picture 2 based on a size of the to-be-photographed object 1001. The target ratio may be a proportion between a size of the to-be-photographed object 1001 and a size of the photographing picture 2, the target ratio may be a proportion between a size of the to-be-photographed object 1001 and a size of a best photographing region in the photographing picture 2, the target ratio may be a proportion between a size of the placeholder region 1002 of the to-be-photographed object 1001 and the size of the photographing picture 2, or the target ratio may be a proportion between the size of the placeholder region of the to-be-photographed object 1001 and the size of the best photographing region in the photographing picture 2.

In addition, the mobile phone may preset a target ratio range for a to-be-photographed object. For example, when a proportion of a to-be-photographed object in a photographing picture is between 50% and 80%, a photographing effect of the to-be-photographed object in the photographing picture is most suitable for human vision. Therefore, the target ratio range may be set to 50%-80%. In this way, if the target ratio of the to-be-photographed object 1001 in the photographing picture 2 falls into the target ratio range, it indicates that the to-be-photographed object 1001 has a relatively good photographing effect in the photographing picture 2. Therefore, the mobile phone does not need to switch to another camera. In this case, the target camera is still the camera B being used.

Correspondingly, if the target ratio of the to-be-photographed object 1001 in the photographing picture 2 is greater than an upper limit of the target ratio range, it indicates that the FOV of the currently used camera B is excessively small, and the mobile phone can determine a camera with a larger FOV (for example, the camera C) as the target camera. Alternatively, if the target ratio of the to-be-photographed object 1001 in the photographing picture 2 is less than a lower limit of the target ratio range, it indicates that the FOV of the currently used camera B is excessively large, and the mobile phone can determine a camera with a smaller FOV (for example, the camera A) as the target camera.

Manner 4 (that is, Step S615)

In manner 4, although the mobile phone has enabled only the first camera (that is, the camera B) in a process of performing the foregoing steps S601 to S603, the mobile phone can determine a relative location relationship between the photographing picture 1 photographed by the camera A, the photographing picture 2 photographed by the camera B, and the photographing picture 3 photographed by the camera C based on the FOV of the camera A, the FOV of the camera B, and the FOV of the camera C. For example, still as shown in FIG. 3, the photographing picture 1 is located at a center of the photographing picture 2 and is 70% a size of the photographing picture 2, and the photographing picture 2 is located at a center of the photographing picture 3 and is 70% a size of the photographing picture 3.

Therefore, if the to-be-photographed object 1001 (or the placeholder region 1002 of the to-be-photographed object 1001) does not coincide with each boundary of the first photographing picture (that is, the photographing picture 2), in other words, if the first photographing picture can completely display the to-be-photographed object 1001, the mobile phone may also determine the to-be-switched-to target camera with reference to a location and a size of the to-be-photographed object 1001 in a photographing picture of another camera (for example, the photographing picture 1 and the photographing picture 3).

For example, step S615 may specifically include the following steps S901 and S902.

S901. The mobile phone determines a candidate camera based on locations of the to-be-photographed object in the first photographing picture, a second photographing picture, and a third photographing picture.

The second photographing picture is a photographing picture captured when a second camera is used for photographing, and the third photographing picture is a photographing picture captured when a third camera is used for photographing.

For example, the mobile phone may consider, as a candidate camera based on a location relationship of the to-be-photographed object in the first photographing picture, the second photographing picture, and the third photographing picture, a camera that can completely photograph the to-be-photographed object. Because the mobile phone has determined that the to-be-photographed object can be displayed completely in the first photographing picture, the first camera (for example, the camera B) currently being used is a candidate camera.

In addition, according to a method of determining, through calculation, whether the to-be-photographed object can be displayed completely in the first photographing picture, the mobile phone may further determine, through calculation, whether the to-be-photographed object can be displayed completely in the second photographing picture and the third photographing picture. For example, the mobile phone may determine, through calculation, whether a boundary of the second photographing picture coincides with the to-be-photographed object (or a placeholder region of the to-be-photographed object). If the boundary of the second photographing picture coincides with the to-be-photographed object (or the placeholder region of the to-be-photographed object), it indicates that the to-be-photographed object cannot be displayed completely in the second photographing picture; or if the boundary of the second photographing picture does not coincide with the to-be-photographed object (or the placeholder region of the to-be-photographed object), it indicates that the to-be-photographed object can be displayed completely in the second photographing picture, and the second camera corresponding to the second photographing picture can serve as a candidate camera. Similarly, the mobile phone may further determine, through calculation, whether a boundary of the third photographing picture coincides with the to-be-photographed object (or a placeholder region of the to-be-photographed object). If the boundary of the third photographing picture coincides with the to-be-photographed object (or the placeholder region of the to-be-photographed object), it indicates that the to-be-photographed object cannot be displayed completely in the third photographing picture; or if the boundary of the third photographing picture does not coincide with the to-be-photographed object (or the placeholder region of the to-be-photographed object), it indicates that the to-be-photographed object can be displayed completely in the third photographing picture, and the third camera corresponding to the third photographing picture can serve as a candidate camera.

It should be noted that a placeholder region of the to-be-photographed object may vary with a photographing picture. In this case, by determining, through calculation, whether a placeholder region of the to-be-photographed object in the first photographing picture coincides with the boundary line of the second photographing picture (or the third photographing picture), the mobile phone may determine whether the to-be-photographed object can be displayed completely in the second photographing picture (or the third photographing picture). Alternatively, by determining, through calculation, whether the placeholder region of the to-be-photographed object in the second photographing picture coincides with the boundary line of the second photographing picture, the mobile phone can determine whether the to-be-photographed object can be displayed completely in the second photographing picture. In addition, by determining, through calculation, whether the placeholder region of the to-be-photographed object in the third photographing picture coincides with the boundary line of the third photographing picture, the mobile phone can determine whether the to-be-photographed object can be displayed completely in the third photographing picture. This is not limited in any manner in this embodiment of this disclosure.

It can be understood that when there is a camera (for example, the camera C) whose FOV is larger than that of a camera (for example, the camera B) for photographing the first photographing picture, the camera (for example, the camera C) may also serve as a candidate camera. When there is a camera (for example, the camera A) whose FOV is smaller than that of the camera (for example, the camera B) for photographing the first photographing picture, whether the camera (for example, the camera A) can serve as a candidate camera may be determined in the foregoing manner.

Figure 11A:
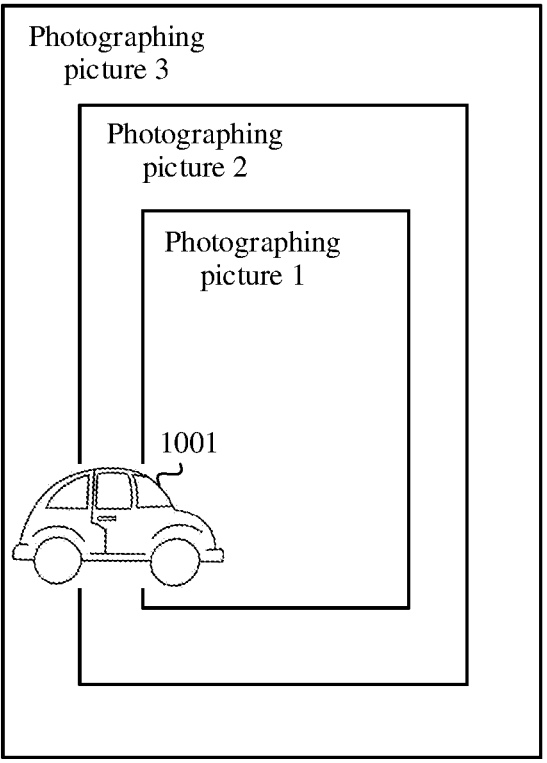
FIG. 11(a) and FIG. 11(b) are fifth schematic diagrams of a scenario of a camera switching method for a terminal according to an embodiment of this disclosure.
Figure 11B:
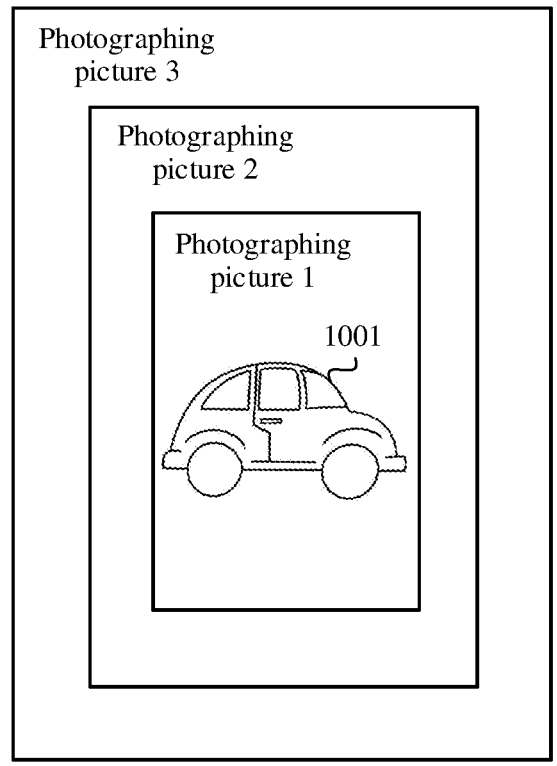

For example, as shown in FIG. 11(*a*), it is assumed that the first camera currently used by the mobile phone is the camera C. In this case, the first photographing picture photographed by the camera C is the photographing picture 3. Then the mobile phone can determine, by performing the foregoing step S611, that the to-be-photographed object 1001 can be displayed completely in the photographing picture 3. In this case, the camera C is a candidate camera. Further, the mobile phone may determine, through calculation, whether the to-be-photographed object 1001 can be displayed completely in the photographing picture 2 photographed by the camera B and the photographing picture 1 photographed by the camera A. If just the photographing picture 3 can completely display the to-be-photographed object 1001, it indicates that the to-be-photographed object 1001 can be photographed completely by using the camera C, but the to-be-photographed object 1001 cannot be photographed completely by using the camera A and the camera B. In this case, the mobile phone can determine the camera C as the only candidate camera. Alternatively, as shown in FIG. 11(b), if the mobile phone determines that both the photographing picture 1 and the photographing picture 2 can completely display the to-be-photographed object 1001, the mobile phone can determine all of the camera A, the camera B, and the camera C as candidate cameras.

Figure 12A:
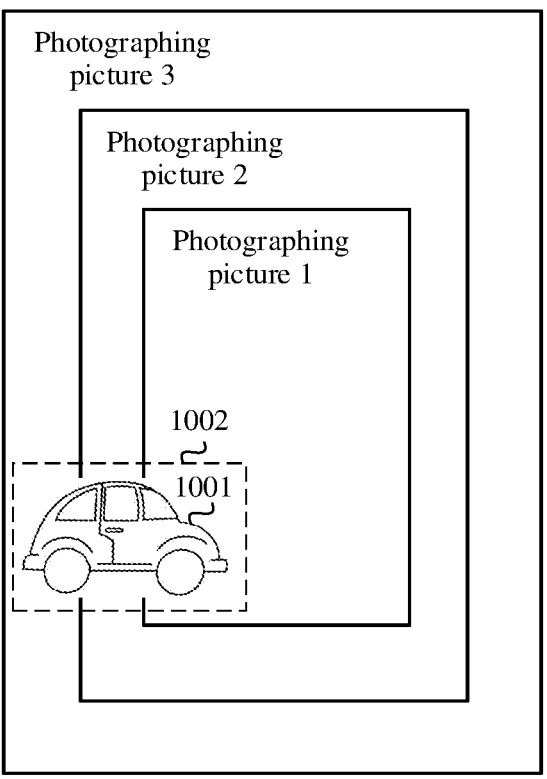
FIG. 12(a) and FIG. 12(b) are sixth schematic diagrams of a scenario of a camera switching method for a terminal according to an embodiment of this disclosure.
Figure 12B:
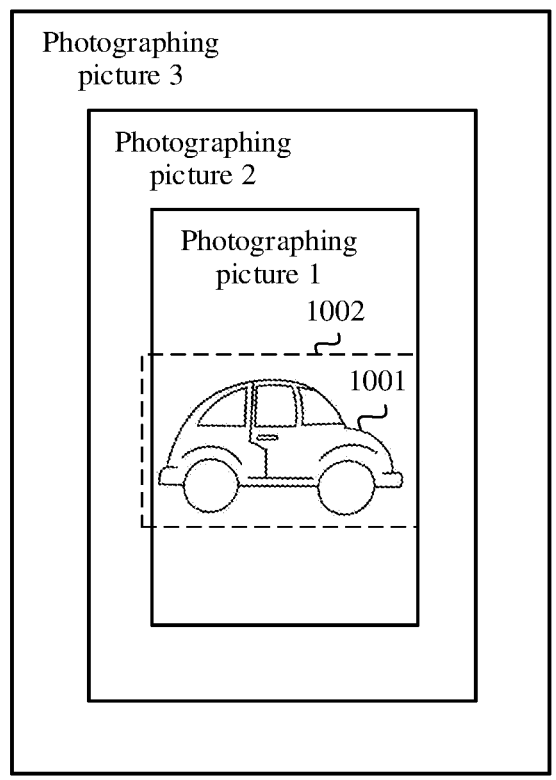

Alternatively, still using the first photographing picture being the photographing picture 3 as an example, as shown in FIG. 12(a) and FIG. 12(b), after determining the to-be-photographed object 1001, the mobile phone may further determine the placeholder region 1002 of the to-be-photographed object 1001. Then the mobile phone determines a location relationship between the placeholder region 1002 and the photographing picture 3 by performing steps S611. As shown in FIG. 12(a), if the photographing picture 3 can completely display the placeholder region 1002 of the to-be-photographed object 1001, the mobile phone can determine the camera C as a candidate camera. In addition, the mobile phone may further determine a location relationship of the placeholder region 1002 relative to the photographing picture 1 and the photographing picture 2. If neither of the photographing picture 1 and the photographing picture 2 can completely display the placeholder region 1002 of the to-be-photographed object 1001, the mobile phone can determine the camera C as the only candidate camera. For another example, as shown in FIG. 12(b), if the photographing picture 2 can completely display the placeholder region 1002 of the to-be-photographed object 1001, but the photographing picture 1 cannot completely display the placeholder region 1002 of the to-be-photographed object 1001, the mobile phone can determine the camera C and the camera B as candidate cameras.

Alternatively, because the photographing picture 1, the photographing picture 2, and the photographing picture 3 each have a best photographing region, when determining a candidate camera, the mobile phone may consider, as a candidate camera, a camera that can completely display the to-be-photographed object 1001 in a best photographing region. This avoids a problem of distortion caused because the to-be-photographed object 1001 is displayed at an edge of a photographing picture, thereby improving a photographing effect of the to-be-photographed object 1001.

If the mobile phone has determined only one candidate camera, for example, the candidate camera determined based on the location of the to-be-photographed object 1001 in FIG. 11(a) includes only the camera C corresponding to the photographing picture 3, in order to completely display the to-be-photographed object 1001 to improve a photographing effect of the to-be-photographed object 1001, the mobile phone can determine the camera C as the target camera.

If the mobile phone has determined a plurality of candidate cameras, it indicates that currently there are a plurality of cameras that can completely photograph the to-be-photographed object. In this case, the mobile phone may continue to perform the following step S902 to determine the target camera with an optimal photographing effect from the plurality of candidate cameras.

S902. When there are a plurality of candidate cameras, the mobile phone determines the target camera from the plurality of candidate cameras based on sizes of the to-be-photographed object in the first photographing picture, the second photographing picture, and the third photographing picture.

When there are a plurality of candidate cameras, the mobile phone can determine a candidate camera with a smallest FOV as the target camera, to improve a ratio of a to-be-photographed object to be photographed subsequently in a photographing picture.

Alternatively, when there are a plurality of candidate cameras, the mobile phone may calculate target ratios of the to-be-photographed object in the first photographing picture, the second photographing picture, and the third photographing picture. For example, the target ratios may be proportions of a size of the to-be-photographed object separately to sizes of the first photographing picture, the second photographing picture, and the third photographing picture; the target ratios may be proportions of the size of the to-be-photographed object separately to sizes of best photographing regions in the first photographing picture, the second photographing picture, and the third photographing picture; the target ratios may be proportions of sizes of the placeholder regions of the to-be-photographed object respectively to the sizes of the first photographing picture, the second photographing picture, and the third photographing picture; or the target ratios may be proportions of the sizes of the placeholder regions of the to-be-photographed object respectively to the sizes of the best photographing regions in the first photographing picture, the second photographing picture, and the third photographing picture.

A display effect of the to-be-photographed object in a photographing picture is more prominent when a ratio of the to-be-photographed object in the photographing picture is larger. Therefore, the mobile phone can determine, as the target camera, a camera corresponding to a photographing picture in which the to-be-photographed object has a greatest ratio.

Alternatively, the mobile phone may further preset an optimal ratio range for a to-be-photographed object. For example, when a proportion of a to-be-photographed object in a photographing picture is between 50% and 80%, a photographing effect of the to-be-photographed object in the photographing picture is most suitable for human vision. Therefore, the optimal ratio range may be set to 50%-80%. In this way, when there are a plurality of candidate cameras, the mobile phone may calculate target ratios of the to-be-photographed object separately in the first photographing picture, the second photographing picture, and the third photographing picture; and further determine, as the target camera, a camera whose photographing picture has a target ratio falling into the optimal ratio range.

Until now, the mobile phone has determined the target camera based on the locations and the sizes of the to-be-photographed object in the first photographing picture, the second photographing picture, and the third photographing picture by performing steps S901 and S902. An optimal photographing effect can be achieved when the mobile phone subsequently uses the target camera to photograph the to-be-photographed object.

In addition, if the target camera determined by the mobile phone in step S604 is consistent with the first camera currently being used, it indicates that the first photographing picture of the to-be-photographed object currently displayed on the mobile phone already presents a best photographing effect. In this case, the mobile phone does not need to switch from the first camera, may continue using the first camera to capture a next frame of first photographing picture, and cyclically perform the foregoing steps S603 and S604.

S605. If the target camera is the second camera, the mobile phone switches from the first camera to the second camera.

Figure 13:
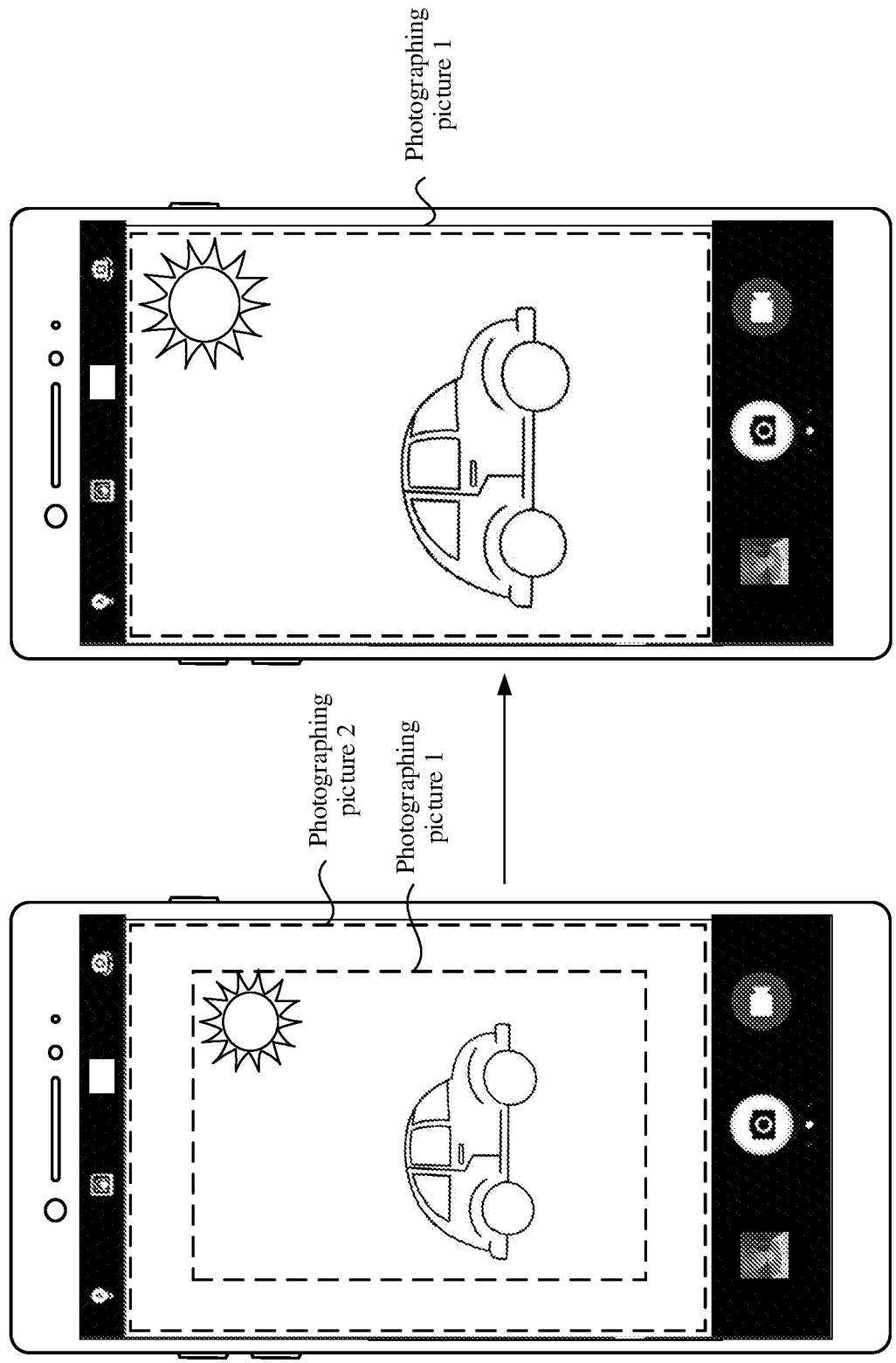
FIG. 13 is a seventh schematic diagram of a scenario of a camera switching method for a terminal according to an embodiment of this disclosure.

For example, the first camera is the foregoing camera B. If the target camera determined by the mobile phone in step S604 is the camera A (that is, the second camera) with a smaller FOV, as shown in FIG. 13, the mobile phone may first enable the camera A in a background while displaying the photographing picture 2 by using the camera B. Then the mobile phone may display, in a foreground on the preview interface of the camera APP, the photographing picture 1 captured by the camera A; and disable the camera B, to complete a process of switching from the camera B to the camera A. This avoids problems such as photographing picture interruption caused when the mobile phone directly disables the camera B and then enables the camera A, thereby improving user experience when the mobile phone switches between cameras.

Alternatively, a visual field of the photographing picture 2 is inconsistent with a visual field of the photographing picture 1. Therefore, the mobile phone may further implement smooth transition in a process of switching from the photographing picture 2 to the photographing picture 1, to avoid a sudden change of vision caused by a jump from the photographing picture 2 to the photographing picture 1, thereby improving user experience.

Figure 14A:
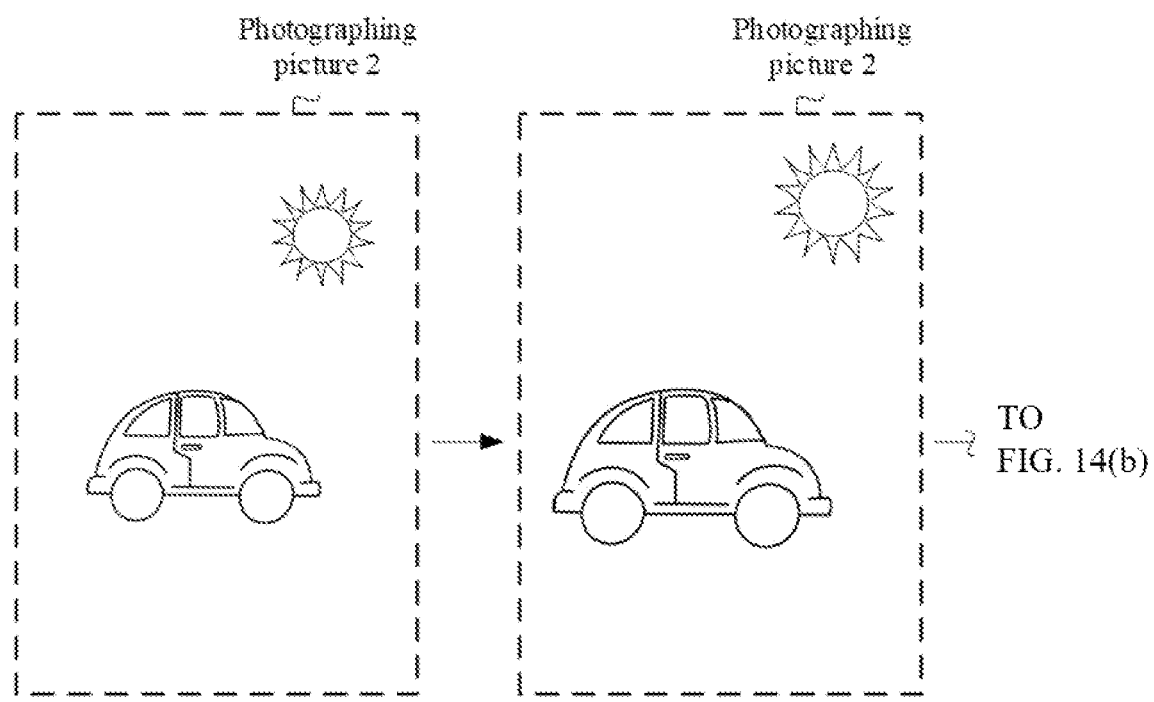
FIG. 14(a) and FIG. 14(b) are eighth schematic diagrams of a scenario of a camera switching method for a terminal according to an embodiment of this disclosure.
Figure 14B:
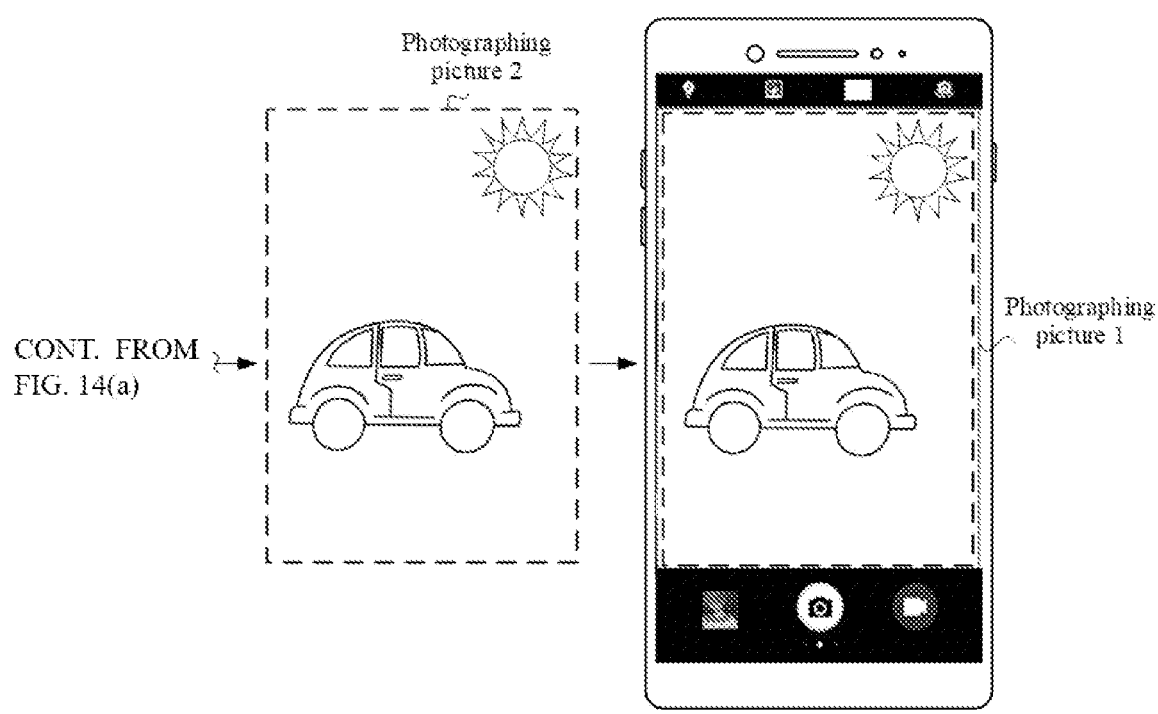

For example, because the photographing picture 2 includes content in the photographing picture 1, after the mobile phone enables the camera A and before the mobile phone switches to the photographing picture 1, as shown in FIG. 14(*a*) and FIG. 14(*b*), the mobile phone may gradually zoom in picture content in the photographing picture 2 through digital zooming. When content that is in the photographing picture 2 and that is displayed on the mobile phone is consistent with the content in the photographing picture 1, the mobile phone may display, on the preview interface of the camera APP, the photographing picture 1 captured by the camera A, to complete the process of switching from the camera B to the camera A.

For another example, a resolution of the photographing picture 1 captured by the camera A is higher than that of a part that is in the photographing picture 2 and that is the same as the photographing picture 1. Therefore, in the foregoing switching process, after enabling the camera A in the background, the mobile phone may further fuse, into the currently displayed photographing picture 2 by using an image fusion technology, the photographing picture 1 captured by the camera A; and gradually zoom in a fused image until content in the fused image is the same as the content in the photographing picture 1. Then the mobile phone may display, on the preview interface of the camera APP, the photographing picture 1 captured by the camera A, to complete the process of switching from the camera B to the camera A.

S606. If the target camera is the third camera, the mobile phone switches from the first camera to the third camera.

Figure 15:
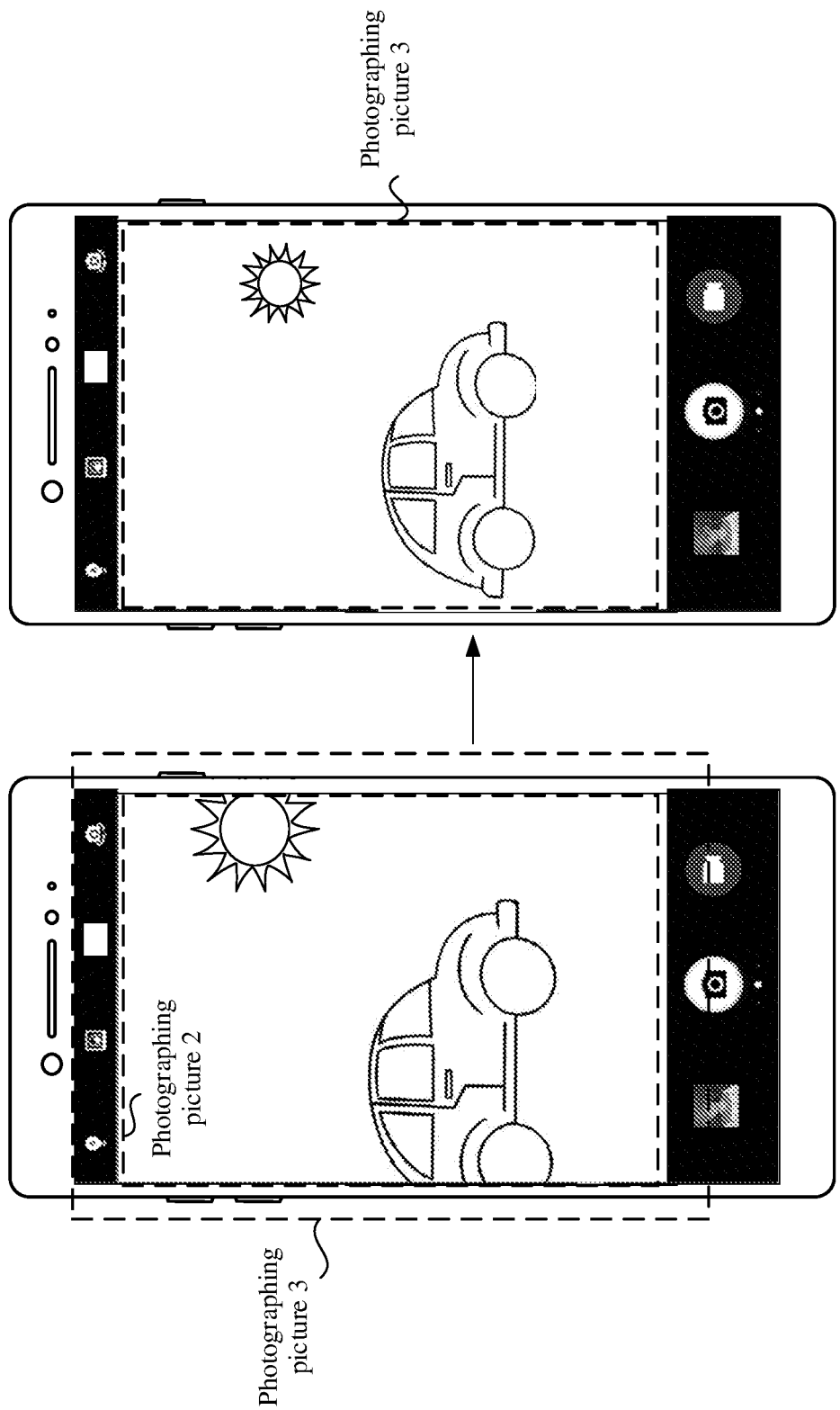
FIG. 15 is a ninth schematic diagram of a scenario of a camera switching method for a terminal according to an embodiment of this disclosure.

For example, the first camera is the foregoing camera B. If the target camera determined by the mobile phone in step S604 is the camera C (that is, the third camera) with a larger FOV, as shown in FIG. 15, the mobile phone may first enable the camera C in a background while displaying the photographing picture 2 by using the camera B. Then the mobile phone may display, in a foreground on the preview interface of the camera APP, the photographing picture 3 captured by the camera C; and disable the camera B, to complete a process of switching from the camera B to the camera C. This avoids problems such as photographing picture interruption caused when the mobile phone directly disables the camera B and then enables the camera C, thereby improving user experience when the mobile phone switches between cameras.

Alternatively, a visual field of the photographing picture 2 is inconsistent with a visual field of the photographing picture 3. Therefore, the mobile phone may further implement smooth transition in a process of switching from the photographing picture 2 to the photographing picture 3, to avoid a sudden change of vision caused by a jump from the photographing picture 2 to the photographing picture 3, thereby improving user experience.

Figure 16A:
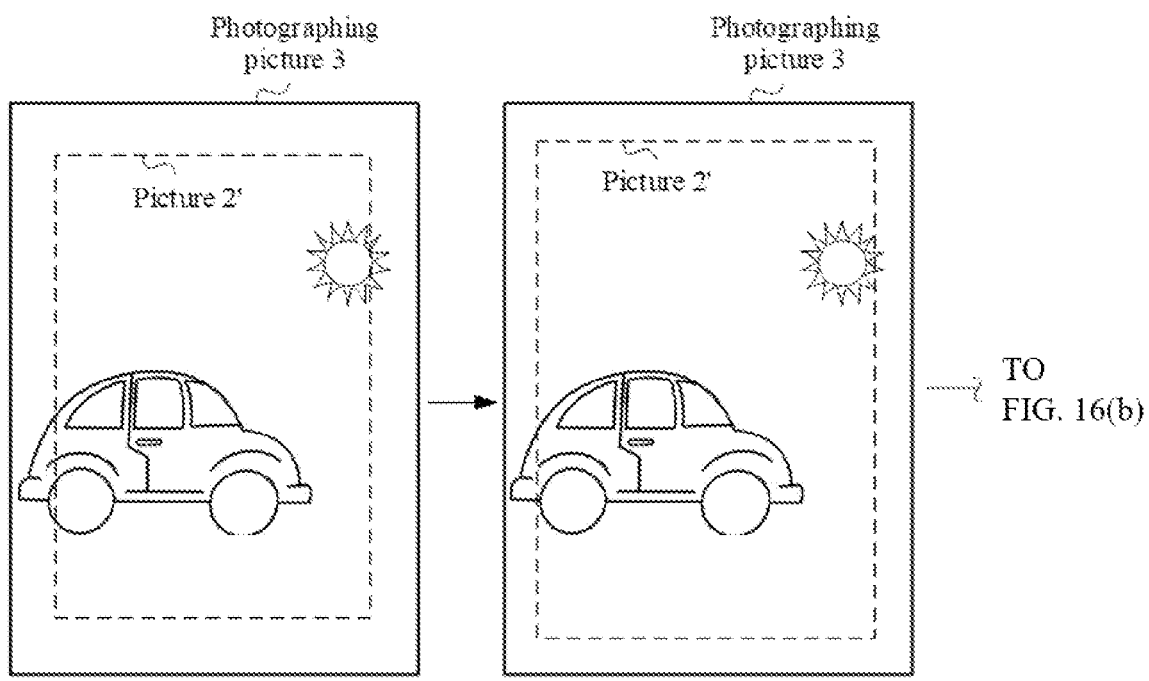
FIG. 16(a) and FIG. 16(b) are tenth schematic diagrams of a scenario of a camera switching method for a terminal according to an embodiment of this disclosure.
Figure 16B:
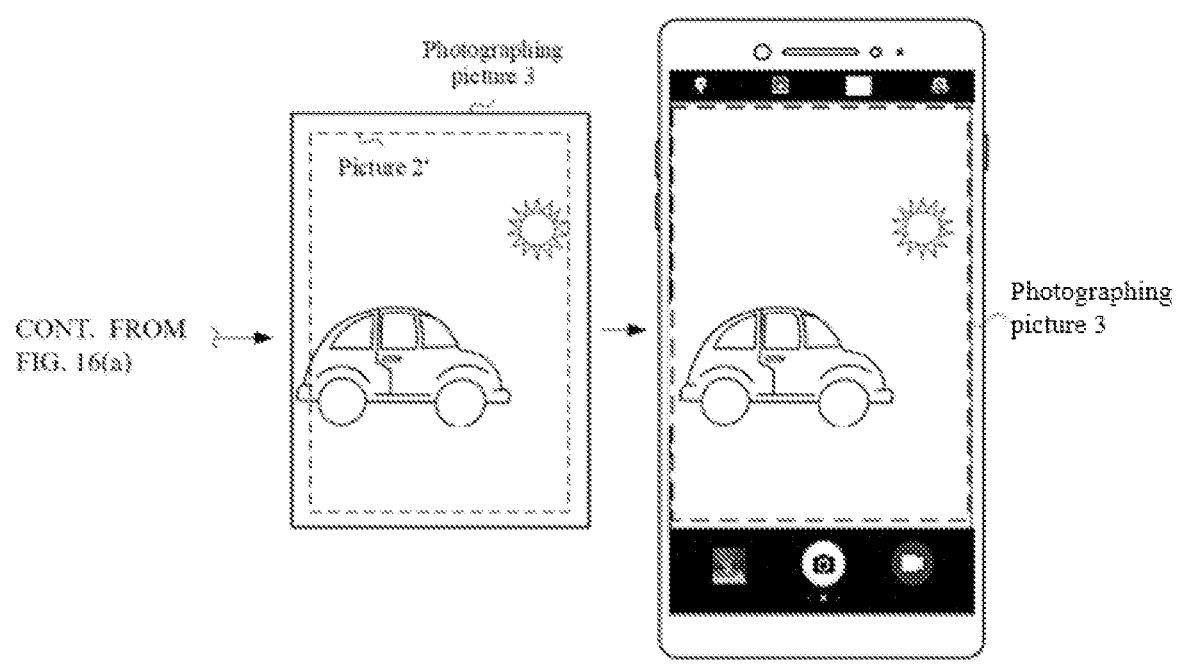

For example, because the photographing picture 3 includes content in the photographing picture 2, as shown in FIG. 16(*a*) and FIG. 16(*b*), after enabling the camera C, the mobile phone may increase, through digital zooming, a focal length of the photographing picture 3 captured by the camera C, to obtain, from the photographing picture 3, a picture 2' with same content as the photographing picture 2. In this case, the mobile phone may disable the camera B being used. Then the mobile phone may gradually restore to a standard focal length of the picture 2', to be specific, gradually decrease the focal length of the photographing picture 3 until the photographing picture 3 is completely displayed on the preview interface of the camera APP, to complete the process of switching from the camera B to the camera C.

For another example, a resolution of the photographing picture 2 captured by the camera B is higher than that of a part that is in the photographing picture 3 and that is the same as the photographing picture 2. Therefore, in the foregoing switching process, after enabling the camera C to capture the photographing picture 3, the mobile phone may further perform image fusion on the photographing picture 3 and the photographing picture 2, extract a part that is the same as the photographing picture 2 from a fused image, and gradually transition to content in the photographing picture 3, to complete the process of switching from the camera B to the camera C.

After switching from the first camera to a new camera by performing the foregoing step S605 or S606, the mobile phone may use the new camera as the first camera to continue to cyclically perform the foregoing steps S602 to S606, to dynamically adjust, based on a to-be-photographed object in a photographing picture, to a proper camera for photographing.

Figure 17:
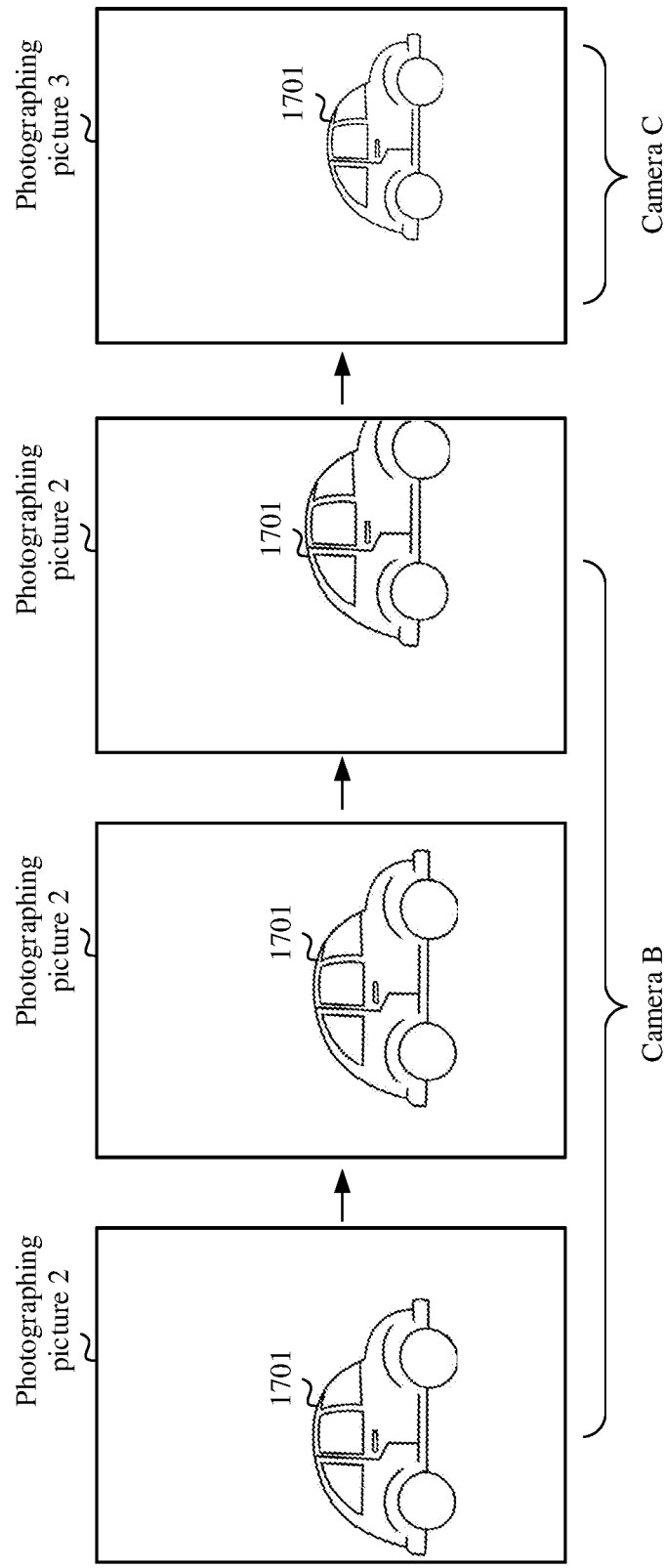
FIG. 17 is an eleventh schematic diagram of a scenario of a camera switching method for a terminal according to an embodiment of this disclosure.

For example, as shown in FIG. 17, when running the camera application, the mobile phone may first enable the camera B and display the photographing picture 2 captured by the camera B. Then the mobile phone can identify the to-be-photographed object in the photographing picture 2. For example, the to-be-photographed object is a car 1701. After determining that the to-be-photographed object is the car 1701, the mobile phone can detect in real time a location and a size of the car 1701 in each frame of photographing picture 2. In this way, in a moving process of the car 1701, if the mobile phone detects that the car 1701 coincides with a boundary line of the photographing picture 2, it indicates that the photographing picture 2 cannot completely display the car 1701. Therefore, the mobile phone may switch from the currently used camera B to the camera C with a larger FOV. At this time, the mobile phone may display the photographing picture 3 captured by the camera C. Because the FOV of the camera C is larger than the FOV of the camera B, the car 1701 is displayed more completely in the photographing picture 3, thereby improving a photographing effect of the to-be-photographed object.

Figure 18:
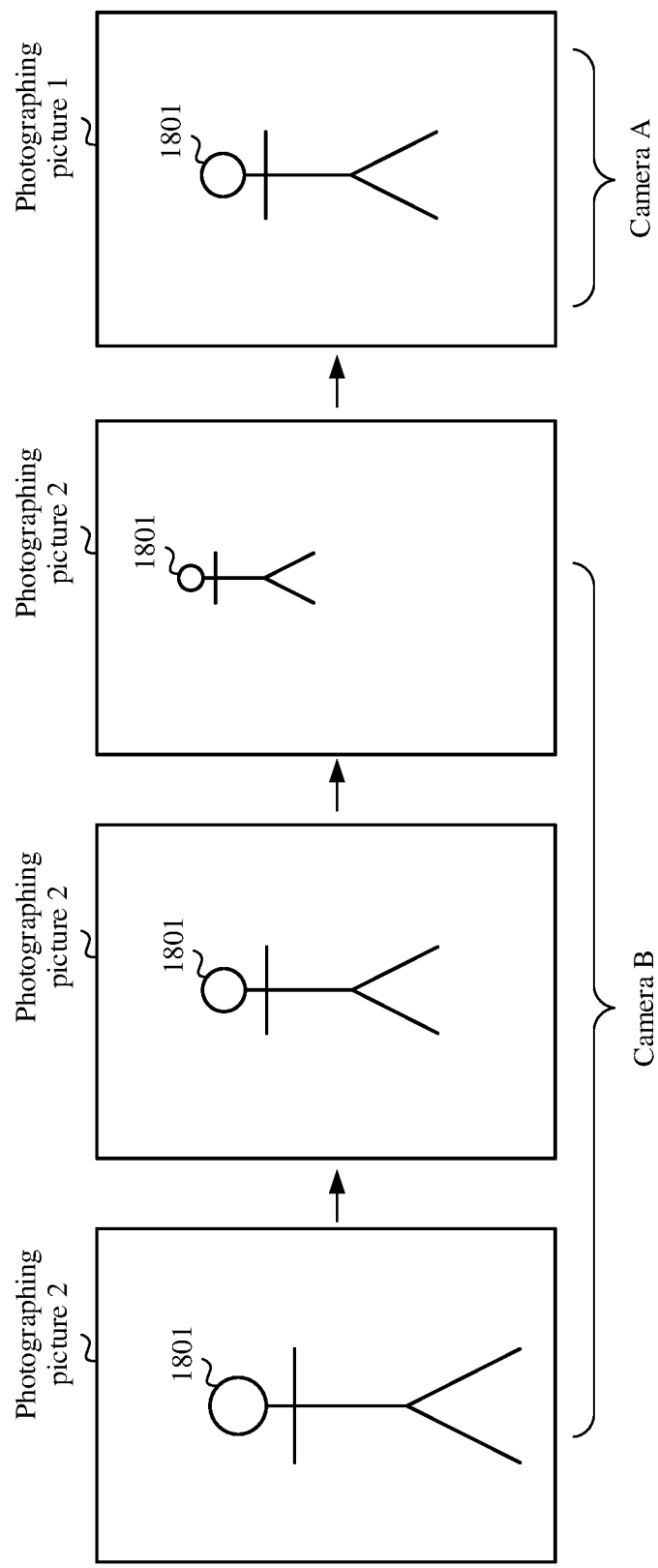
FIG. 18 is a twelfth schematic diagram of a scenario of a camera switching method for a terminal according to an embodiment of this disclosure.

Alternatively, as shown in FIG. 18, when running the camera application, the mobile phone may first enable the camera B and display the photographing picture 2 captured by the camera B. Then the mobile phone can identify the to-be-photographed object in the photographing picture 2. For example, the to-be-photographed object is a user 1801. After determining that the to-be-photographed object is the user 1801, the mobile phone can detect in real time a location and a size of the user 1801 in each frame of photographing picture 2. In this way, in a moving process of the user 1801, if the mobile phone detects that a target ratio of the user 1801 in the photographing picture 2 is less than the lower limit of the target ratio range, it indicates that a display area of the user 1801 in the photographing picture 2 is excessively small. Therefore, the mobile phone may switch from the currently used camera B to the camera A with a smaller FOV. At this time, the mobile phone may display the photographing picture 1 captured by the camera A. Because the FOV of the camera A is smaller than the FOV of the camera B, a target ratio of the user 1801 in the photographing picture 3 is increased. Correspondingly, if the mobile phone detects that the target ratio of the user 1801 in the photographing picture 2 is greater than the upper limit of the target ratio range, it indicates that the display area of the user 1801 in the photographing picture 2 is excessively large. Therefore, the mobile phone may switch from the currently used camera B to the camera C with a larger FOV. Because the FOV of the camera C is larger than the FOV of the camera B, the target ratio of the user 1801 in the photographing picture 3 captured by the camera C is decreased, thereby improving a photographing effect of the to-be-photographed object.

It should be noted that the foregoing embodiment is described by using a process of switching between the three cameras, that is, the first camera, the second camera, and the third camera, as an example. It can be understood that the camera switching method provided in this embodiment of this disclosure may also be applied to a scenario of switching between two cameras or applied to a scenario of switching between more than three cameras. This is not limited in any manner in this embodiment of this disclosure.

Until now, by performing the foregoing steps S601 to S606, the mobile phone can determine a current to-be-photographed object in a photographing scenario, and determine a target camera with a better photographing effect based on parameters such as a location and a size of the to-be-photographed object, thereby smoothly transitioning from a current photographing picture to a photographing picture captured by the target camera. This can implement an automatic camera switching function in a photographing process based on the to-be-photographed object, thereby improving a photographing effect of the to-be-photographed object.

Figure 19:
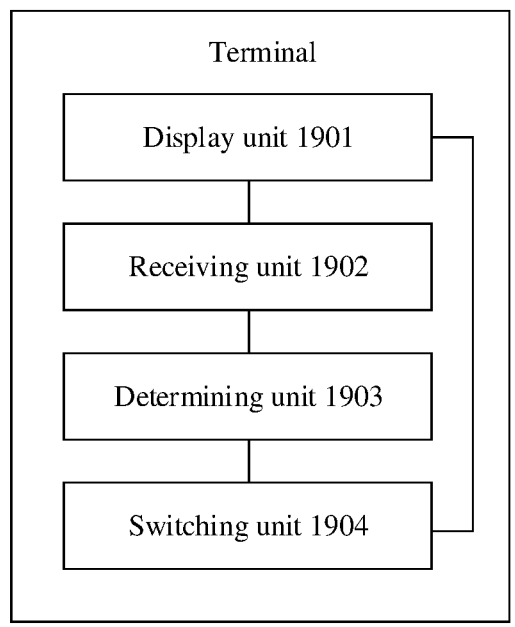
FIG. 19 is a third schematic structural diagram of a terminal according to an embodiment of this disclosure.

In some embodiments, an embodiment of this disclosure discloses a terminal. As shown in FIG. 19, the terminal is configured to implement the method described in each of the foregoing method embodiments; and includes a display unit 1901, a receiving unit 1902, a determining unit 1903, and a switching unit 1904. The display unit 1901 is configured to support the terminal in performing the procedure S602 in FIG. 6A. The receiving unit 1902 is configured to support the terminal in performing the procedure S601 in FIG. 6A. The determining unit 1903 is configured to support the terminal in performing the procedures S603 and S604 in FIG. 6A and procedures S611 to S615 in FIG. 6B. The switching unit 1904 is configured to support the terminal in performing the procedure S605 or S606 in FIG. 6A. All related content in the steps in the foregoing method embodiment can be cited in function descriptions of corresponding function modules. Details are not described herein again.

Figure 20:
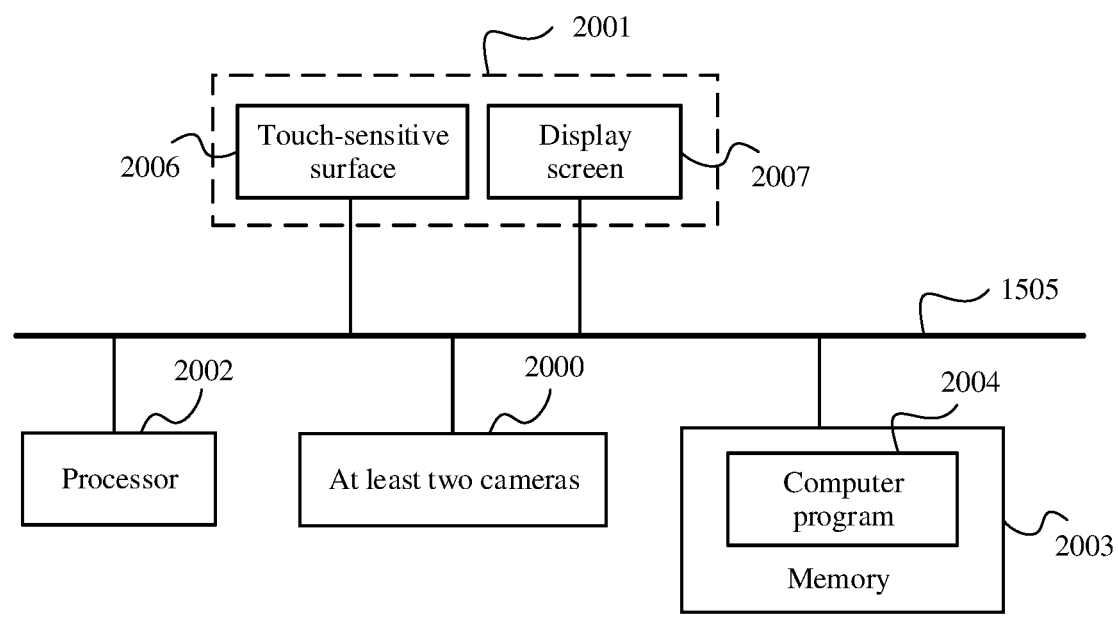
FIG. 20 is a fourth schematic structural diagram of a terminal according to an embodiment of this disclosure.

In some other embodiments, an embodiment of this disclosure discloses a terminal. The terminal includes a processor, and a memory, an input device, and an output device that are connected to the processor. The input device and the output device can be integrated as one device. For example, a touch-sensitive surface can be used as the input device, a display screen can be used as the output device, and the touch-sensitive surface and the display screen are integrated as a touchscreen. In this case, as shown in FIG. 20, the terminal may include at least two cameras 2000, a touchscreen 2001, one or more processors 2002, a memory 2003, one or more application programs (not illustrated), and one or more computer programs 2004, where the touchscreen 2001 includes a touch-sensitive surface 2006 and a display screen 2007. The components may be connected by using one or more communications bus 2005. The one or more computer programs 2004 are stored in the memory 2003 and configured to be executed by the one or more processors 2002. The one or more computer programs 2004 include an instruction. The instruction may be used to perform the steps in FIG. 6A, FIG. 6B, and corresponding embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this disclosure. The foregoing storage medium includes: any medium that can store program code, such as a flash memory, a removable hard disk, a read-only memory, a random access memory, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of the embodiments of this disclosure shall be subject to the protection scope of the claims.

The invention claimed is:

1. A camera switching method for a terminal, wherein the terminal comprises a first camera and a second camera and wherein a field of view (FOV) of the second camera is larger than a FOV of the first camera, the method comprising:
   displaying, by the terminal in response to a first operation of enabling a photographing function by a user, a first photographing preview interface captured by the first camera, wherein the first photographing preview interface comprises a to-be-photographed object;
   determining, by the terminal, to switch from the first camera to the second camera based on a size and/or a location of the to-be-photographed object in the first photographing preview interface; and
   switching, by the terminal, from the first photographing preview interface to a second photographing preview interface captured by the second camera, and disabling the first camera;
   the switching, by the terminal, from the first photographing preview interface to the second photographing preview interface captured by the second camera comprises:
   enabling, by the terminal, the second camera in a background to capture a second photographing picture;
   gradually zooming in, by the terminal, content in the second photographing picture through digital zooming;
   when the zoomed-in content in the second photographing picture is consistent with content in the first photographing picture, disabling, by the terminal, the first camera and displaying the zoomed-in content in the second photographing picture in a foreground.

2. The camera switching method according to claim 1, wherein the determining, by the terminal, to switch from the first camera to the second camera based on the size and/or the location of the to-be-photographed object in the first photographing preview interface comprises:
   determining, by the terminal through calculation, whether the to-be-photographed object is displayed completely in a photographing region in the first photographing picture, wherein the photographing region is located in a center of the first photographing picture; and
   if the to-be-photographed object cannot be displayed completely in the best photographing region, determining, by the terminal, to switch to the second camera.

3. The camera switching method according to claim 1, wherein the determining, by the terminal, to switch from the first camera to the second camera based on the size and/or the location of the to-be-photographed object in the first photographing preview interface comprises:
   determining, by the terminal, that a boundary of the first photographing preview interface coincides with the to-be-photographed object; and
   determining, by the terminal, to switch to the second camera based on the determining that the boundary of the first photographing preview interface coincides with the to-be-photographed object.

4. The camera switching method according to claim 3, wherein the determining, by the terminal, that the boundary of the first photographing preview interface coincides with the to-be-photographed object comprises:
   determining, by the terminal, that a coincident part of the boundary of the first photographing preview interface and the to-be-photographed object satisfies a first condition.

5. The camera switching method according to claim 1, wherein the determining, by the terminal, to switch from the first camera to the second camera based on the size and/or the location of the to-be-photographed object in the first photographing preview interface comprises:
   determining, by the terminal, a target ratio of the to-be-photographed object in the first photographing preview interface; and
   determining, by the terminal, to switch to the second camera if the target ratio is greater than an upper limit of a target ratio range.

6. The camera switching method according to claim 1, wherein the determining, by the terminal, to switch from the first camera to the second camera based on the size and/or the location of the to-be-photographed object in the first photographing preview interface comprises:
   determining, by the terminal, whether the to-be-photographed object is displayed completely in a photographing region in the first photographing preview interface; and
   determining, by the terminal, to switch to the second camera if the to-be-photographed object cannot be displayed completely in the photographing region.

7. The camera switching method according to claim 1, further comprises:
   gradually restoring, by the terminal, to a standard focal length for capturing the second photographing picture until the terminal completely displays the second photographing picture.

8. A terminal, comprising:
   a touchscreen, wherein the touchscreen comprises a touch-sensitive surface and a display;
   one or more processors;
   one or more memories;
   a first camera and a second camera, wherein a field of view (FOV) of the second camera is larger than a FOV of the first camera; and
   one or more computer programs, wherein the one or more computer programs are stored in the one or more memories, the one or more computer programs comprise instructions; and when the instructions are executed by the terminal, the terminal is configured to perform steps comprising:
   displaying, by the terminal in response to a first operation of enabling a photographing function by a user, a first photographing preview interface captured by the first camera, wherein the first photographing preview interface comprises a to-be-photographed object;
   determining, by the terminal, to switch from the first camera to the second camera based on a size and/or a location of the to-be-photographed object in the first photographing preview interface; and
   switching, by the terminal, from the first photographing preview interface to a second photographing preview interface captured by the second camera, and disabling the first camera;
   the switching, by the terminal, from the first photographing preview interface to the second photographing preview interface captured by the second camera comprises:
   enabling, by the terminal, the second camera in a background to capture a second photographing picture;
   gradually zooming in, by the terminal, content in the second photographing picture through digital zooming;
   when the zoomed-in content in the second photographing picture is consistent with content in the first photographing picture, disabling, by the terminal, the first camera and displaying the zoomed-in continent in the second photographing picture in a foreground.

9. The terminal according to claim 8, wherein the terminal is further configured to perform:
- determining, by the terminal through calculation, whether the to-be-photographed object is displayed completely in a photographing region in the first photographing picture, wherein the best photographing region is located in a center of the first photographing picture; and
- if the to-be-photographed object cannot be displayed completely in the photographing region, determining, by the terminal, to switch to the second camera.

10. The terminal according to claim 8, wherein the terminal is further configured to perform:
- determining, by the terminal, that a boundary of the first photographing preview interface coincides with the to-be-photographed object; and
- determining, by the terminal, to switch to the second camera based on the determining that the boundary of the first photographing preview interface coincides with the to-be-photographed object.

11. The terminal according to claim 10, wherein the terminal is further configured to perform:
- determining, by the terminal, that a coincident part of the boundary of the first photographing preview interface and the to-be-photographed object satisfies a first condition.

12. The terminal according to claim 8, wherein the terminal is further configured to perform:
- determining, by the terminal, a target ratio of the to-be-photographed object in the first photographing preview interface; and
- determining, by the terminal, to switch to the second camera if the target ratio is greater than an upper limit of a target ratio range.

13. The terminal according to claim 8, wherein the terminal is further configured to perform:
- determining, by the terminal, whether the to-be-photographed object is displayed completely in a photographing region in the first photographing preview interface; and
- determining, by the terminal, to switch to the second camera if the to-be-photographed object cannot be displayed completely in the photographing region.

14. The terminal according to claim 8, wherein the terminal is further configured to perform:
- gradually restoring, by the terminal, to a standard focal length for capturing the second photographing picture until the terminal completely displays the second photographing picture.

15. A terminal, comprising:
- a touchscreen, wherein the touchscreen comprises a touch-sensitive surface and a display;
- one or more processors;
- one or more memories;
- a first camera and a second camera, wherein a field of view (FOV) of the second camera is larger than a FOV of the first camera; and
- one or more computer programs, wherein the one or more computer programs are stored in the one or more memories, the one or more computer programs comprise instructions; and when the instructions are executed by the terminal, the terminal is configured to perform steps comprising:
  - displaying, by the terminal in response to a first operation of enabling a photographing function by a user, a first photographing preview interface captured by the first camera, wherein the first photographing preview interface comprises a to-be-photographed object;
  - determining, by the terminal, to switch from the first camera to the second camera based on a size and/or a location of the to-be-photographed object in the first photographing preview interface; and
  - switching, by the terminal, from the first photographing preview interface to a second photographing preview interface captured by the second camera, and disabling the first camera;
  - the switching, by the terminal, from the first photographing preview interface to the second photographing preview interface captured by the second camera comprises:
    - enabling, by the terminal, the second camera in a background to capture a second photographing picture;
    - gradually zooming in, by the terminal, content in the second photographing picture through digital zooming;
    - gradually restoring, by the terminal, to a standard focal length for capturing the second photographing picture until the terminal completely displays the second photographing picture.

16. The terminal according to claim 15, wherein the terminal is further configured to perform:
- determining, by the terminal through calculation, whether the to-be-photographed object is displayed completely in a photographing region in the first photographing picture, wherein the best photographing region is located in a center of the first photographing picture; and
- if the to-be-photographed object cannot be displayed completely in the photographing region, determining, by the terminal, to switch to the second camera.

17. The terminal according to claim 15, wherein the terminal is further configured to perform:
- determining, by the terminal, that a boundary of the first photographing preview interface coincides with the to-be-photographed object; and
- determining, by the terminal, to switch to the second camera based on the determining that the boundary of the first photographing preview interface coincides with the to-be-photographed object.

18. The terminal according to claim 17, wherein the terminal is further configured to perform:
- determining, by the terminal, that a coincident part of the boundary of the first photographing preview interface and the to-be-photographed object satisfies a first condition.

19. The terminal according to claim 15, wherein the terminal is further configured to perform:
- determining, by the terminal, a target ratio of the to-be-photographed object in the first photographing preview interface; and
- determining, by the terminal, to switch to the second camera if the target ratio is greater than an upper limit of a target ratio range.

20. The terminal according to claim 15, wherein the terminal is further configured to perform:
- determining, by the terminal, whether the to-be-photographed object is displayed completely in a photographing region in the first photographing preview interface; and
- determining, by the terminal, to switch to the second camera if the to-be-photographed object cannot be displayed completely in the photographing region.

\* \* \* \* \*

UNITED STATES PATENT AND TRADEMARK OFFICE
CERTIFICATE OF CORRECTION

| | |
|---|---|
| PATENT NO. | : 11,595,566 B2 |
| APPLICATION NO. | : 17/854324 |
| DATED | : February 28, 2023 |
| INVENTOR(S) | : Chao Qin |

It is certified that error appears in the above-identified patent and that said Letters Patent is hereby corrected as shown below:

In the Claims

Column 34, Line 66, Claim 8, reads:
"… and displaying the zoomed-in continent…"

Should read:
"…and displaying the zoomed-in content…".

Signed and Sealed this
Fourth Day of April, 2023

Katherine Kelly Vidal
*Director of the United States Patent and Trademark Office*